United States Patent
Huang et al.

(10) Patent No.: US 10,820,231 B2
(45) Date of Patent: Oct. 27, 2020

(54) SYSTEMS AND METHODS FOR APN BASED COS AND QOS CONTROL FOR NETWORK SERVICES

(71) Applicant: Verizon Patent and Licensing Inc., Arlington, VA (US)

(72) Inventors: Ye Huang, San Ramon, CA (US); Miguel A. Carames, Argyle, TX (US); Martin A. Iroff, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 23 days.

(21) Appl. No.: 16/006,198

(22) Filed: Jun. 12, 2018

(65) Prior Publication Data

US 2019/0380060 A1   Dec. 12, 2019

(51) Int. Cl.
  *H04W 28/02*   (2009.01)
  *H04L 12/851*   (2013.01)

(52) U.S. Cl.
  CPC ..... *H04W 28/0268* (2013.01); *H04L 47/2408* (2013.01)

(58) Field of Classification Search
  CPC .......... H04W 28/0268; H04W 28/0215; H04L 47/2408; H04L 45/74
  See application file for complete search history.

(56) References Cited

U.S. PATENT DOCUMENTS

| | | | | |
|---|---|---|---|---|
| 2004/0081093 A1* | 4/2004 | Haddock | ................. | H04L 47/10 370/230 |
| 2008/0212473 A1* | 9/2008 | Sankey | .................... | H04L 12/66 370/235 |
| 2015/0040121 A1* | 2/2015 | Barabash | ............ | G06F 9/45558 718/1 |
| 2018/0270710 A1* | 9/2018 | Hua | ....................... | H04W 28/10 |
| 2018/0324652 A1* | 11/2018 | Ryu | ........................ | H04W 8/04 |
| 2018/0324671 A1* | 11/2018 | Palnati | ................ | H04L 63/0876 |

* cited by examiner

*Primary Examiner* — Christopher P Grey

(57) ABSTRACT

A mobility management node in a wireless network receives message data from an Internet of Things (IoT) device. The mobility management node obtains a non-Internet Protocol (IP) Access Point Name (APN) associated with the message data, and extracts Class of Service (CoS) and/or Quality of Service (QoS) indicators embedded in the non-IP APN. The mobility management node queues and prioritizes the message data, among other message data, based on the extracted CoS and QoS indicators. The mobility management node dequeues and forwards the message data, among the other message data, from the mobility management node to a Service Capability Exposure Function (SCEF) node based on the extracted CoS and QoS indicators.

20 Claims, 18 Drawing Sheets

| CoS | Cons/hr | NIDD Msgs/hr | Daily NIDD Msgs |
|---|---|---|---|
| 1 | 5 Cons/hr | 5 NIDD Msgs/hr | 100 Daily |
| 2 | 1 Con/hr | 2 NIDD Msgs/hr | 50 Daily |
| ... | ... | ... | ... |

| QoS | QoS Level | Priority | Preemption |
|---|---|---|---|
| 1 | High | Mission critical apps | Yes |
| 2 | Medium | Real-time or near real-time | No |
| 3 | Low | Can tolerate delay and retry | No |

SYSTEMS AND METHODS FOR APN BASED COS AND QOS CONTROL FOR NETWORK SERVICES

BACKGROUND

Users of wireless devices, communicating within wireless networks such as Public Land Mobile Networks (PLMNs), often attempt to connect to a network that is connected to the wireless network. For example, the user of a wireless device may attempt to use a web browsing application at the wireless device to connect to the Internet via a PLMN. In such wireless networks, Access Point Names (APNs) may be used for identifying another network (e.g., the Internet, an Internet Protocol Multimedia Subsystem (IMS) network), and/or a particular gateway associated with the other network, that a wireless device user wants to communicate with, and, additionally, may be used for defining a type of service to be provided via the other network. When the wireless network receives a connection request that includes a particular APN, the wireless network examines the APN to determine what type of network connection should be created, and to which other network the requesting wireless device should be connected.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Figure 1:
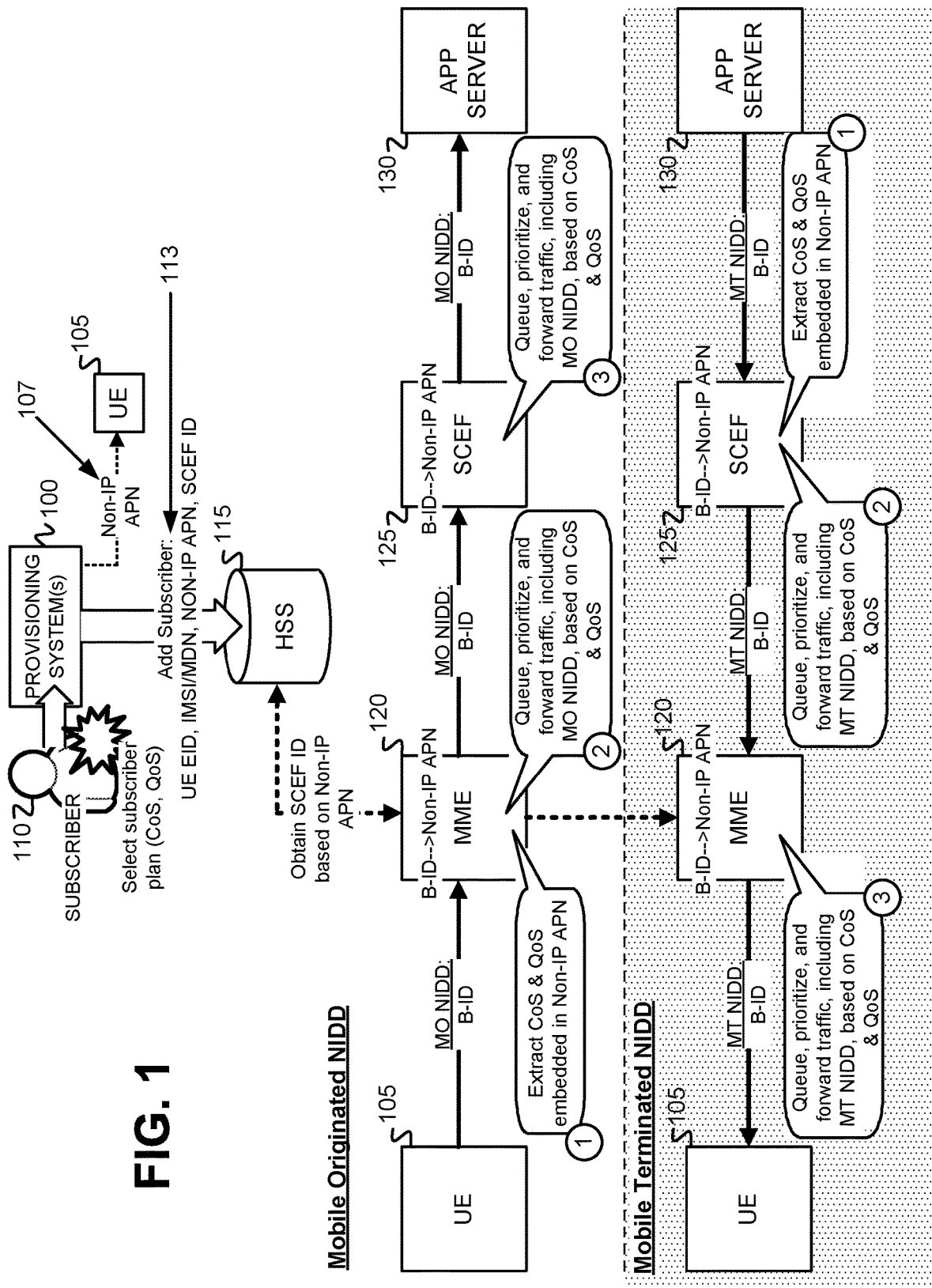
FIG. 1 illustrates an exemplary overview of the delivery of data between Internet of Things (IoTs) devices and application servers via a control plane within a wireless network.

FIG. 1 illustrates an exemplary overview of the delivery of non-Internet Protocol (IP) data between Internet of Things (IoT) user equipment (UE) devices and application (app) servers via a control plane within a wireless network. FIG. 1 further depicts an exemplary overview of control of the non-IP data delivery using Class of Service (CoS) and Quality of Service (QoS) indicators embedded within Access Point Names (APNs) used for connecting the IoT UE devices and the app servers. As shown in FIG. 1, a provisioning system(s) 100 may first receive account enrollment data and selection of a subscription plan from a subscriber 110. Multiple, differentiated wireless network service plans may be offered to the subscriber 110, with each different plan having an associated data delivery CoS and/or QoS and an associated subscription cost. The multiple wireless network service plans may, for example, include service and pricing plans for providing non-IP data delivery (NIDD) to, and from, IoT UE devices. The subscriber 110 may select a specific plan from the multiple offered plans when establishing an account with the wireless network service provider. Upon selection of the service plan, provisioning system(s) 100 determines the CoS and QoS associated with that plan and generates a non-IP APN by embedding CoS and QoS indicators among the other identifiers in the APN. The generated non-IP APN 107 may then, as shown in FIG. 1, be provided to the IoT UE 105 for use in NIDD to/from the IoT UE 105. UE 105, and other network elements involved in connecting UE 105 with an app server 130, may bind the generated non-IP APN with, for example, a bearer ID (B-ID) assigned to a transport session between UE 105 and the app server 130 such that the B-ID may be used to retrieve the non-IP APN from the binding in local memory.

Provisioning system(s) 100, upon receipt of the account enrollment data and subscriber plan selection from subscriber 110, determines a Service Capability Exposure Function (SCEF) ID for a SCEF that may be used for connecting the IoT UE(s) to the subscriber 110's application server 130. Provisioning system(s) 100 then sends "add subscriber" information 113 to a Home Subscriber Server (HSS) 115 in the wireless network service provider's wireless network (not shown), where the "add subscriber" information 113 may include a UE identifier (ID), an International Mobile Subscriber Identity (IMSI) and/or Mobile Directory Number (MDN) associated with the UE, the non-IP APN, and the determined SCEF ID. Subsequent to subscriber 110 obtaining the wireless network subscription for NIDD for subscriber 110's IoT UE device(s) 105, IoT UE device 105 may send NIDD data, via a control plane of the wireless network, as "mobile originated NIDD." Additionally, UE 105 may receive NIDD data, via the control plane of the wireless network, as "mobile terminated NIDD."

FIG. 1 first shows "Mobile Originated NIDD" involving the UE 105 sending NIDD data to an app server 130 via the wireless network. As shown, the IoT UE 105 sends the Mobile Originated (MO) NIDD data, along with a bearer ID (B-ID)) assigned to the transport session, to a Mobile Management Entity (MME) 120 within the wireless network. MME 120 may have previously bound the B-ID, assigned to the transport session, with the non-IP APN generated for the UE 105. MME 120 retrieves the non-IP APN (e.g., from local memory) based on the B-ID, and extracts the CoS and QoS indicators embedded in the APN. MME 120 then proceeds to queue, prioritize, and forward traffic, including the MO NIDD data received from UE 105, based on the extracted CoS and QoS indicators. A SCEF node 125 receives the MO NIDD data from MME 120, along with the B-ID. SCEF 125 may have previously bound the B-ID, assigned to the transport session, with the non-IP APN generated for the UE 105. SCEF 125 retrieves the non-IP APN based on the B-ID (e.g., from local memory), and queues, prioritizes and forwards traffic, including the received MOD NIDD data, based on the CoS and QoS indicators embedded in the APN. App server 130 receives the MO NIDD data from SCEF node 125, and may store and/or process the data accordingly.

FIG. 1 additionally shows "Mobile Terminated NIDD" data delivery involving app server 130 sending Mobile Terminated (MT) NIDD message data to an IoT UE device 105 via the wireless network. As shown, app server 130 sends the MT NIDD data, along with a B-ID assigned to the transport session, to a SCEF node 125. Upon receipt of the MT NIDD data, the SCEF 125 retrieves the non-IP APN (e.g., from local memory), previously bound to the B-ID assigned to the transport session, and extracts CoS and QoS indicators embedded in the non-IP APN. The SCEF node 125 then queues, prioritizes, and forwards traffic, including the MT NIDD data, based on the extracted CoS and QoS. MME 120 receives the MT NIDD data forwarded from SCEF 125, along with the B-ID. MME 120 may have previously bound the B-ID, assigned to the transport session, with the non-IP APN generated for the UE 105. MME 120 retrieves the non-IP APN based on the B-ID (e.g., from local memory), and queues, prioritizes, and forwards the traffic, including the MT NIDD, based on the CoS and QoS indicators embedded in the APN. IoT UE device 105 receives the MT NIDD data forwarded from MME 120 via the control plane in the wireless network.

Figure 2:
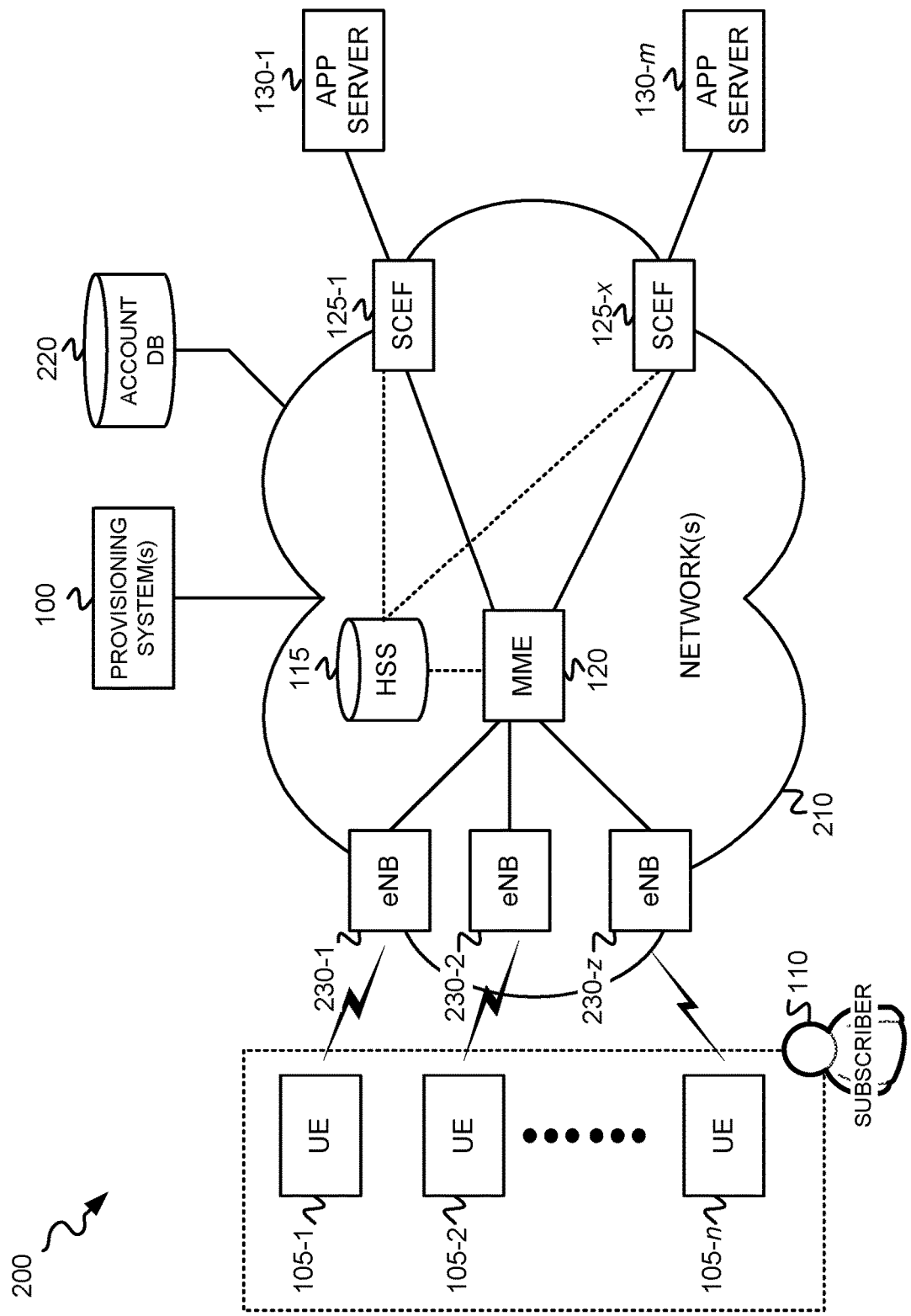
FIG. 2 depicts an exemplary network environment in which non-Internet Protocol (IP) data is delivered via a control plane of a wireless network between IoT devices and application servers.

FIG. 2 depicts an exemplary network environment 200 in which non-IP data is delivered via a control plane of a wireless network between IoT UE devices 105 and app servers 130. As shown, network environment 200 may include multiple UEs 105-1 through 105-*n* (where n is greater than or equal to one), one or more network(s) 210, a provisioning system(s) 100, an account database (DB) 220, and one or more app servers 130-1 through 130-*m* (where m is greater than or equal to one) that connect to wireless network 210.

UEs 105-1 through 105-*n* (referred to herein as "UE 105" or "UEs 105") may each include any type of electronic device that includes a wireless communication interface for communicating with network 210 via a wireless connection. In one implementation, UEs 105 may each include a Machine-to-Machine (M2M) device, or an "Internet of Things" (IoT) device. In other implementations, UEs 105 may each include a cellular telephone; a "smart" phone; a personal digital assistant (PDA); a wearable computer; a desktop, laptop, palmtop or tablet computer; or a media player. A subscriber 110 may be associated with UEs 105, where subscriber 110 may be an owner, operator, administrator, and/or a permanent or temporary user of UEs 105.

Network(s) 210 includes one or more wireless networks, and possibly one or more other types of networks of various types. The one or more wireless networks may each include, for example, a wireless Public Land Mobile Network (PLMN) or a wireless satellite network that is operated and/or administered by a particular wireless network service provider (a "carrier"). The PLMN may include a Code Division Multiple Access (CDMA) 2000 PLMN, a GSM PLMN, a Long Term Evolution (LTE) PLMN and/or other types of PLMNs not specifically described herein. The one or more other types of networks of various types may include, for example, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, an Internet Protocol (IP) Multimedia Subsystem (IMS) network, and/or a cable network (e.g., an optical cable network).

Provisioning system(s) 100 includes one or more network devices that, among other functions, permit a subscriber 110 to establish an account for UE devices 105, such as IoT UE devices, to send and receive message data via a control plane of a wireless network. Provisioning system(s) 100 receives selection of a subscription plan, from the subscriber 110, that has an associated subscription cost along with an associated Class of Service (CoS) and Quality of Service (QoS).

Account database (DB) 220 includes one or more network devices that further include a memory device(s) that store a data structure, such as the data structure described below with respect to FIG. 4. Account DB 220 may store account data and subscription plan selection data for a subscriber 110's UE 105*s*.

Each of app servers 130 includes one or more network devices that send message data to, and receive message data from, UEs 105 via a control plane of the wireless network. NIDD may be used, as described herein, for delivering message data from app servers 130 to UEs 105, and from UEs 105 to app servers 130.

FIG. 2 further depicts exemplary components of a wireless network of network(s) 210. As shown, the wireless network may include evolved NodeBs (eNBs) 230-1 through 230-*z* (generically referred to herein as "eNBs 230" or "eNB 230"), an MME 120, an HSS 125, SCEF nodes 125-1 through 125-*x* (where x is greater than or equal to one), and app servers 130-1 through 130-*m* (where m is greater than or equal to one). Though not shown, wireless network 210 may additionally include one or more serving gateways (SGWs) and packet data network gateways (PGWs).

eNBs 230 (also referred to herein as "base stations") each include hardware that wirelessly communicates directly with wireless devices (e.g., UEs 105) to enable network service with the wireless network (e.g., a PLMN). Each of eNBs 230 includes a wireless transceiver for communicating with the wireless devices, and a wired or wireless link for connecting to other nodes of the wireless network such as, for example, wired links to a SGW or MME 120.

MME 120 includes one or more network devices that perform, within wireless network 210, mobility management functions, call control management functions, session management functions, and/or identity management functions associated with providing wireless service to UEs 105. MME 120 may additionally serves as a node for receiving and forwarding mobile originated (MO) or mobile terminated (MT) NIDD data via a control plane within the wireless network.

HSS 115 includes one or more network devices that further include a memory device(s) that stores a data structure, such as the data structure described below with respect to FIG. 5. HSS 115 may additionally store subscriber profiles that further include subscriber lists of allowed APNs. HSS 115 may perform, based on the information stored in the data structure, a user authentication function, a session establishment function, and/or an access authorization function.

The SGWs (not shown) include one or more network devices that route and forward IP data packets received from UEs 105 and destined for destination nodes in network 210; and also route and forward IP data packets received from the PGWs (not shown) destined for one or more UEs 105.

The PGWs (not shown) each includes one or more network devices that provide connectivity from the UEs 105 to other networks connected to wireless network 205, such as other external networks. Each of the PGWs may be associated with a different APN that is used to connect a UE 105 to the PGW, and then on to another external network.

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2. For example, though a single subscriber 110 is shown as being associated with UEs 105, multiple subscribers 110 may exist in network environment 200, with each subscriber 110 being associated with one or more particular UEs 105.

Figure 3:
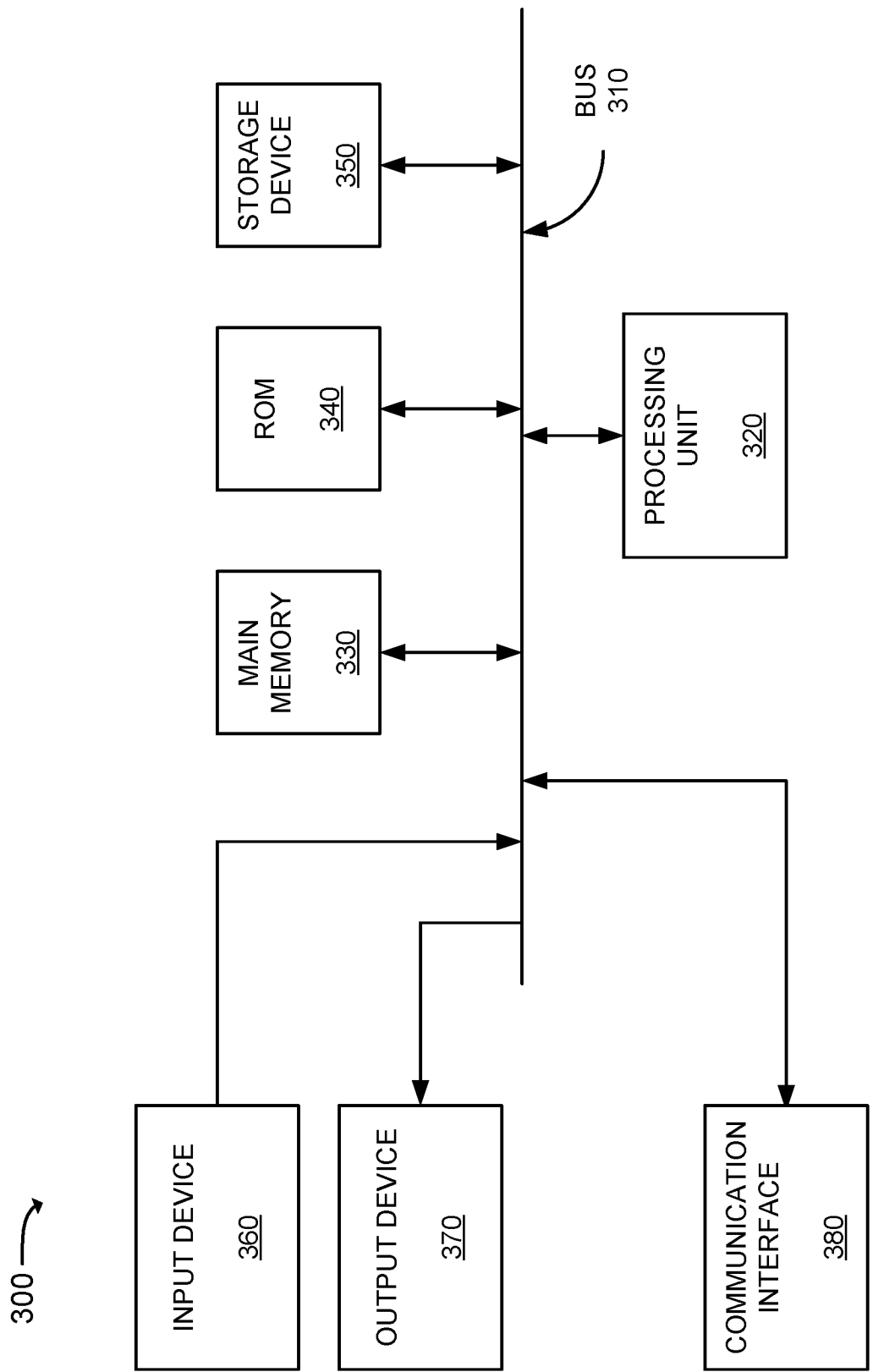
FIG. 3 is a diagram that depicts exemplary components of a network device that may correspond to the provisioning device, account database, user equipment, eNodeBs, Home Subscriber Server (HSS), Mobility Management Entity (MME), Service Capability Exposure Function (SCEF) nodes, and application servers of FIG. 2.

FIG. 3 is a diagram that depicts exemplary components of a network device 300. Provisioning system(s) 100, account DB 220, UEs 105, eNBs 225, HSS 115, MME 120, SCEF nodes 125, and app servers 130 may each include a device or devices similar to network device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may be a "tangible and/or non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network(s) 210. In the case of device 300 being an IoT UE 105, communication interface(s) 380 may include only a wireless transceiver(s), such as, for example, a transceiver for communicating with an eNB 230 of a wireless network of network(s) 210.

The configuration of components of network device 300 shown in FIG. 3 is for illustrative purposes. Other configurations may be implemented. Therefore, network device 300 may include additional, fewer and/or different components, arranged in a different configuration, than depicted in FIG. 3. For example, an IoT UE 105 may include similar components to those shown in FIG. 3, but may omit input device(s) 360, output device(s) 370, and storage device 350.

Figure 4:
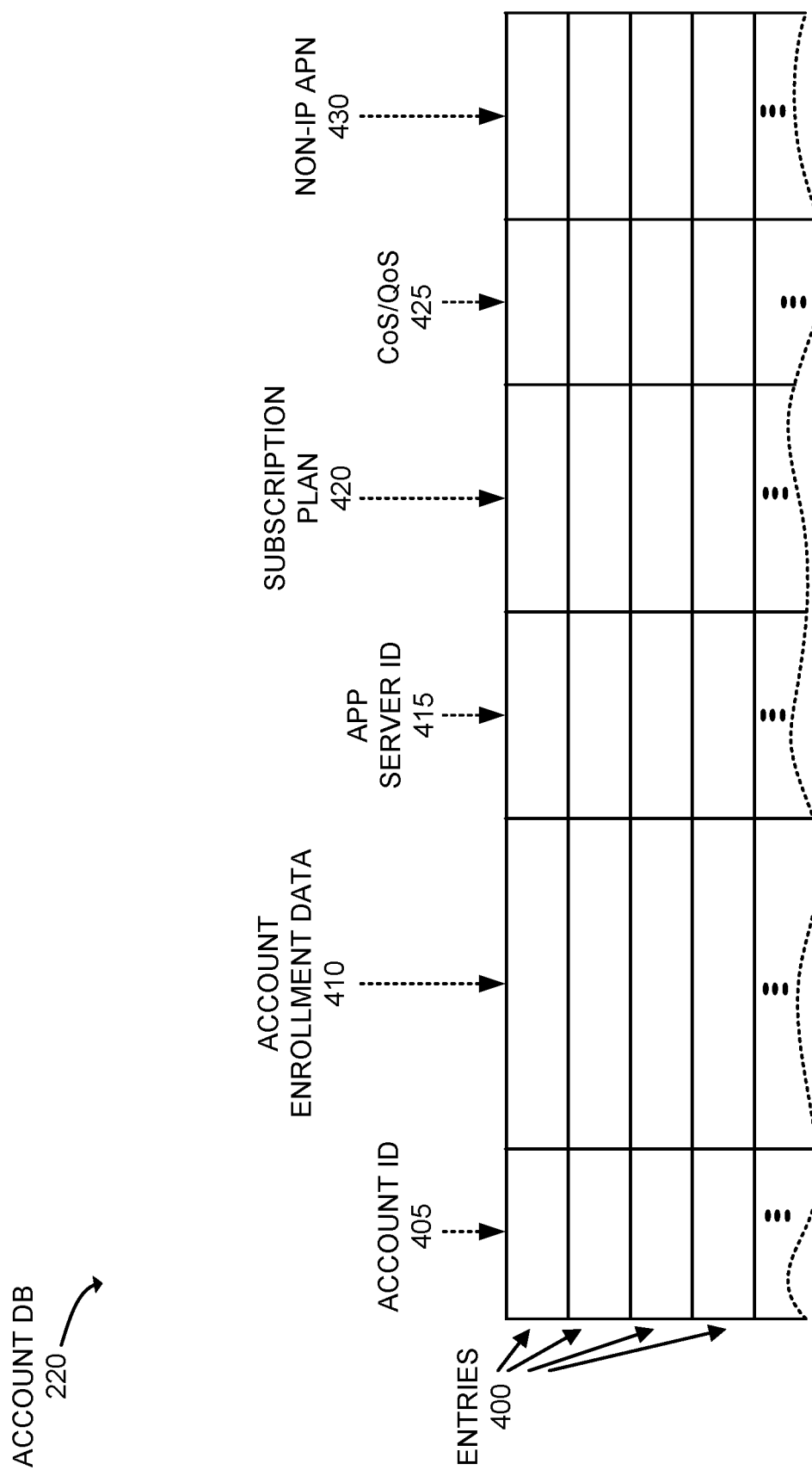
FIG. 4 is a diagram that depicts an exemplary implementation of the account database of FIG. 2.

FIG. 4 is a diagram that depicts an exemplary implementation of account DB 220. As shown, a data structure of account DB 220 may include multiple entries 400, with each entry 400 including an account identifier (ID) field 405, an account enrollment data field 410, an app server ID field 415, a subscription plan field 420, a Class of Service (CoS) & Quality of Service (QoS) field 425, and a non-IP APN field 430. The data structure of account DB 220 may be stored within a memory of a network device 300.

Account identifier (ID) field 405 stores a unique identifier (e.g., a globally unique identifier (GUID) associated with an account of a subscriber 110. Account enrollment data field 410 stores data detailing account enrollment data of the subscriber 110. The account enrollment data may include, for example, a name, address, contact information (e.g., phone number, email address, mailing address, etc.), payment information (e.g., credit card, debit card, bank account), and UE identifiers (e.g., IMSI and/or MDN of each UE) associated with a particular subscriber 110.

App server ID field 415 stores a unique identifier for an app server 130 that is associated with the account identified in field 405. The unique identifier may include, for example, a network address (e.g., an IP address) of an app server 130.

Subscription plan field 420 stores data identifying the subscription plan selected by the subscriber 110 for the subscriber's UEs 105. The selected subscription plan includes a cost, and network services, provided by the wireless network service provider to the subscriber 110's UEs 105. In one implementation, the selected subscription plan may include a Class of Service and Quality of Service to be applied by wireless network elements (e.g., MME 120 and SCEFs 125) to traffic sent by, and sent to, the subscriber 110's UEs 105.

CoS/QoS field 425 stores data identifying the Class of Service (CoS) and/or Quality of Service (QoS) to be applied by wireless network elements of the wireless network during NIDD over the control plane.

Non-IP APN field 430 stores a non-IP APN, which is embedded with CoS and QoS indicators, and which is used by the wireless network for queuing, prioritizing, forwarding, and routing NIDD traffic sent to and from UEs 105.

To locate a particular entry at account DB 220, account DB 220 may be queried with, for example, an account ID to locate an entry 400 having a matching account ID stored in field 405. When such an entry 400 is located, data may be stored in one or more fields 405, 410, 415, 420, 425, and/or 430, or data may be retrieved from one or more fields 405, 410, 415, 420, 425, and/or 430. Other fields of an entry 400, instead of account ID field 405, may alternatively be used for querying HSS 115.

Figure 5:
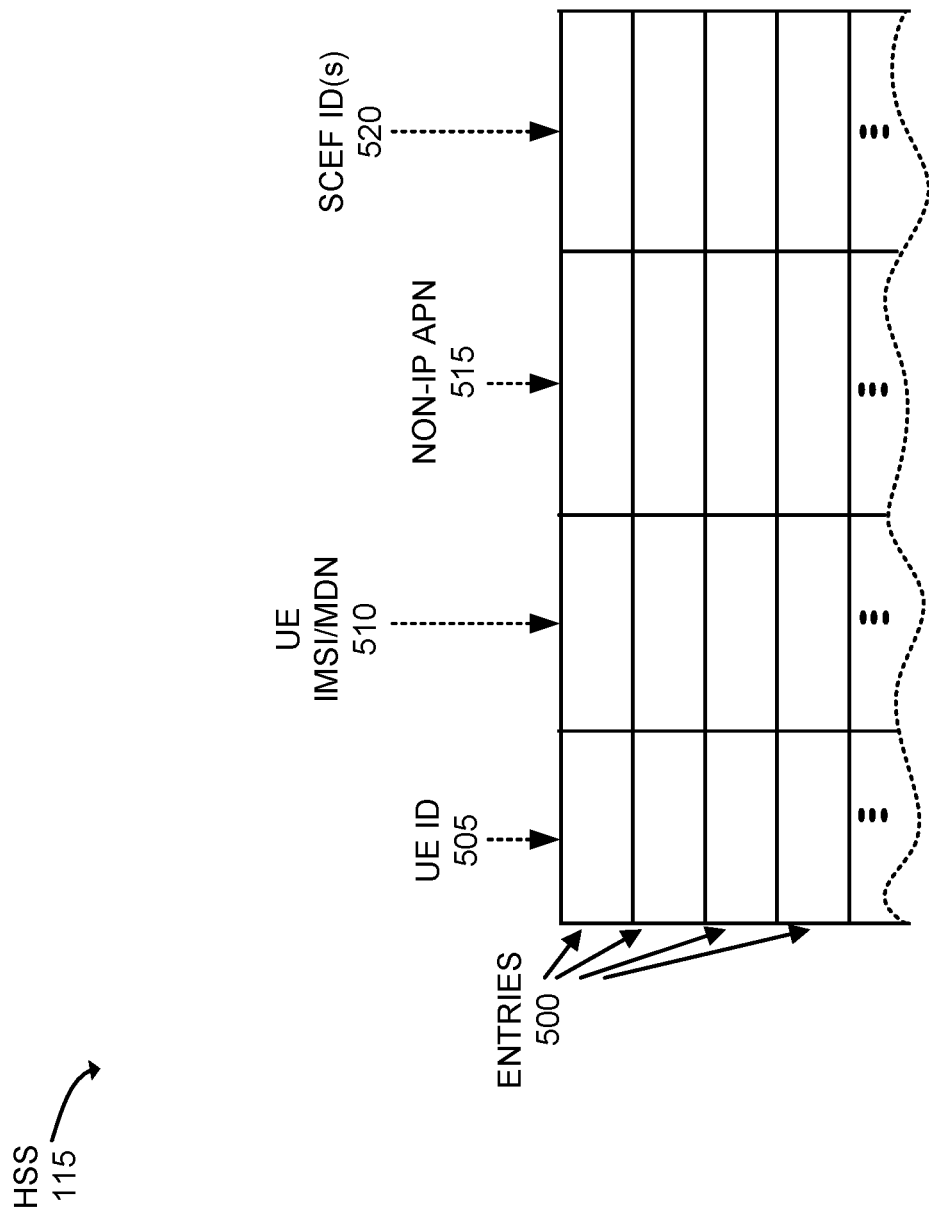
FIG. 5 is a diagram that depicts an exemplary implementation of the HSS of FIG. 2.

FIG. 5 is a diagram that depicts an exemplary implementation of HSS 115. As shown, a data structure of HSS 115 may include multiple entries 500, with each entry 500 including a UE identifier (ID) field 505, a UE IMSI/MDN field 510, a non-IP APN field 515, and a SCEF ID(s) field 520. The data structure of HSS 115 may be stored within a memory of a network device 300.

UE identifier (ID) field 505 stores a unique identifier (e.g., a globally unique ID (GUID)) for a respective UE 105. Any type of unique identifier may be assigned to a particular UE 105 and used for identification purposes. UE IMSI/MDN field 510 stores an International Mobile Subscriber Identity (IMSI) and/or Mobile Directory Number (MDN) for the UE 105 identified in field 505.

Non-IP APN field 515 stores a non-IP APN to be used by network elements in the wireless network (e.g., MME 120, SCEF 125) for delivering non-IP message data to/from the UE 105 identified in field 505 via a control plane of wireless network(s) 210. SCEF ID(s) field 520 stores an identifier of an SCEF node 125 that is to serve as a node for receiving NIDD message data from a UE 105 and forwarding the NIDD message data to a destination app server 130, and for receiving NIDD message data from an app server 130 and forwarding the NIDD message data to the UE 105.

To locate a particular entry at HSS 115, HSS 115 may be queried with, for example, a UE ID to locate an entry 500 having a matching UE ID stored in field 505. When such an entry 500 is located, data may be stored in one or more fields 505, 510, 515 and/or 520, or data may be retrieved from one or more fields 505, 510, 515 and/or 520. Other fields of an entry 500, instead of field 505, may alternatively be used for querying HSS 115.

Account DB 220 and HSS 115 are depicted in FIGS. 4 and 5 as including tabular data structures with each data structure having a certain number of fields having certain content. The tabular data structures of account DB 220 and HSS 115 shown in FIGS. 4 and 5, however, are for illustrative purposes. Other types of data structures may alternatively be used. The number, types, and content of the entries and/or fields in the data structures of account DB 220 and HSS 115 illustrated in FIGS. 4 and 5 are also for illustrative purposes. Other data structures having different numbers of, types of and/or content of, the entries and/or the fields may be implemented. Therefore, account DB 220 and HSS 125 may each include additional, fewer and/or different entries and/or fields than those depicted in FIGS. 4 and 5.

Figure 6:
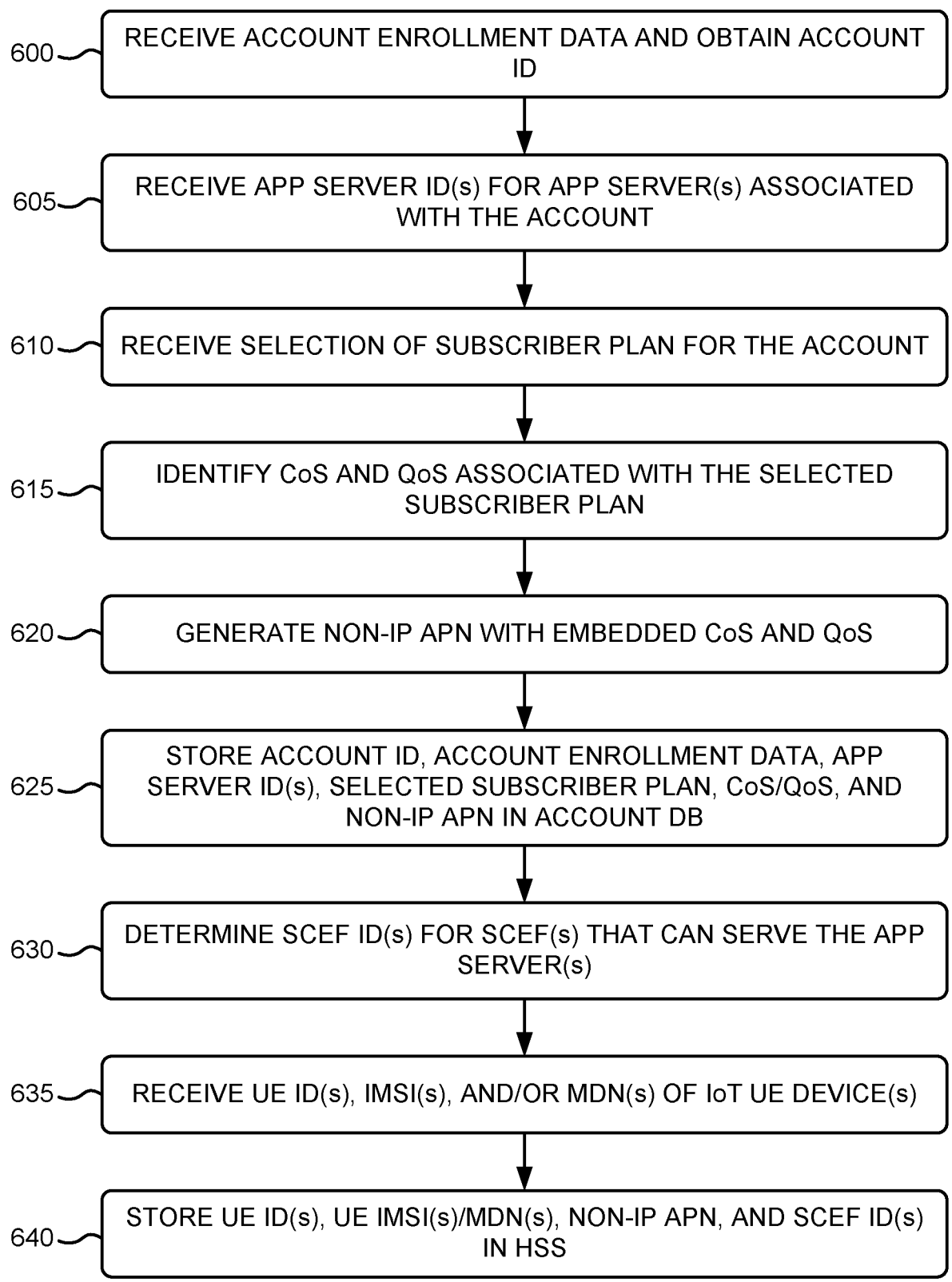
FIG. 6 is a flow diagram that illustrates an exemplary process for a subscriber to establish an account with a wireless network service provider for receiving non-IP Data Delivery (NIDD) service for the subscriber's user equipment devices.

FIG. 6 is a flow diagram that illustrates an exemplary process for a subscriber 110 to establish an account with wireless network service provider for receiving NIDD service for the subscriber 110's UE(s) 105. In one implementation, the exemplary process of FIG. 6 may be implemented by provisioning system(s) 100. The exemplary process of FIG. 6 is described below with reference to the messaging/operations diagram of FIG. 7.

Figure 7:
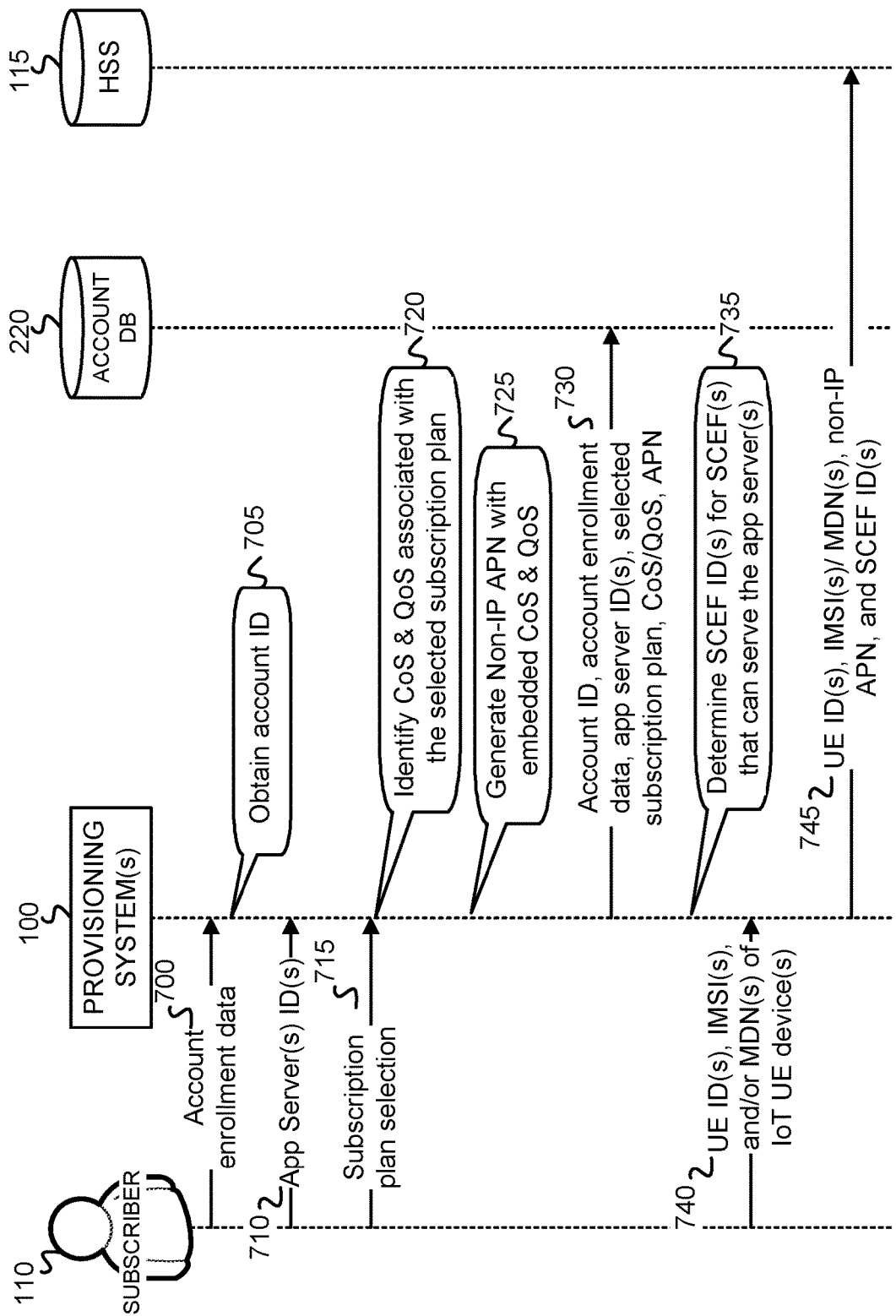
FIG. 7 is an exemplary operations/messaging diagram associated with the exemplary process of FIG. 6.

The exemplary process includes provisioning system(s) 100 receiving account enrollment data from a subscriber 110 and obtaining an account ID (block 600). The subscriber 110 may, via a smart phone or computer, provide account enrollment data that includes, for example, the subscriber 110's name, contact information (e.g., phone number, email address, mailing address), and payment information (e.g., credit card, debit card, or band account information). In one implementation, the account ID associated with the subscriber 110 may be assigned by an external entity (e.g., an account representative) and supplied to provisioning system(s) 100, or retrieved by provisioning system(s) 100 from storage. In another implementation, provisioning system(s) 100 may use any type of algorithm that generates a globally unique account ID for the subscriber 110. FIG. 7 depicts subscriber 110 supplying account enrollment data 700 to provisioning system(s) 100, and provisioning system(s) 100 obtaining 705 an account ID for the account corresponding to the received account enrollment data 700.

Provisioning system(s) 100 receives an app server(s) ID for an app server(s) to be associated with the account (block 605). Subscriber 110 may own, operate or administer a group of IoT UEs 105 that are to send data to, and/or receive data from, one or more app servers 130 that are known to the subscriber 110. Subscriber 110 obtains the app ID(s) of the one or more app servers 130 and supplies the app ID(s) to provisioning system(s) 100. In one implementation, the app ID(s) may include a network address (or addresses) for the app server(s) 130, such as, for example, an Internet Protocol (IP) address for the app server(s) 130. FIG. 7 depicts subscriber 110 supplying the app server(s) ID(s) 710 to provisioning system(s) 100.

Figure 8A:
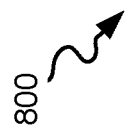
FIG. 8A is a diagram that depicts an example of a mapping of different Classes of Service (CoS) and connections per hour, NIDD messages per hour, and daily messages.
Figure 8B:
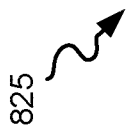
FIG. 8B is a diagram that depicts an example of a mapping of different levels of Quality of Service (QoS) to traffic priority and traffic preemption.

Provisioning system(s) 100 receives selection of a subscription plan for the account (block 610). Provisioning system(s) 100 may offer multiple NIDD subscription plans to subscriber 110, with each subscription plan having a certain cost, CoS, QoS, and quantity of connections or data associated with the plan. The plans having a greater quantity of connections or data (e.g., connections/hour, NIDD messages/hour, NIDD messages/day), higher CoS, and/or higher QoS have a correspondingly higher subscription cost. The plans having a lesser quantity of connections or data, a lesser CoS, and/or a lesser QoS have a correspondingly lower subscription cost. The subscription plans available may have at least two levels of CoS, and at least two levels of QoS. For example, the offered subscription plans may include a first level of CoS and a second level of CoS, where traffic having a first level of CoS is prioritized over traffic having a second level of CoS. FIG. 8A depicts one example of a mapping 800 of traffic CoS to connections per hour, NIDD messages per hour, and daily messages. A CoS level 805 of 1 corresponds to 5 connections per hour 810, 5 NIDD messages per hour 815, and a daily maximum of 100 daily NIDD messages. As shown, a CoS level 805 of 2 corresponds to 1 connection per hour 810, 2 NIDD messages per hour 815, and a maximum of 50 NIDD messages per day. More than two CoS levels may be offered to subscriber 110 for selection via a subscriber plan. As another example, the offered subscription plans may include three different levels of QoS—low QoS, medium QoS, and high QoS, such as depicted in the example mapping 825 of FIG. 8B. The low QoS (QoS of 1) 830 is for NIDD traffic having a priority level 840 that can tolerate delay and retry efforts, but that is not designated for traffic pre-emption 845. The medium QoS (QoS of 2) 830 is for NIDD traffic having a priority level 840 associated with real-time or near real-time application traffic, but that is not designated for traffic pre-emption 845. The high QoS (QoS of 3) 830 is for NIDD traffic that includes mission critical applications whose traffic is to be given priority over all other types of traffic, and that is designated for traffic pre-emption 845 such that QoS level 3 NIDD traffic preempts all other traffic during traffic queuing and forwarding at, for example, MME 120 and/or SCEF node 125.

Figure 8C:
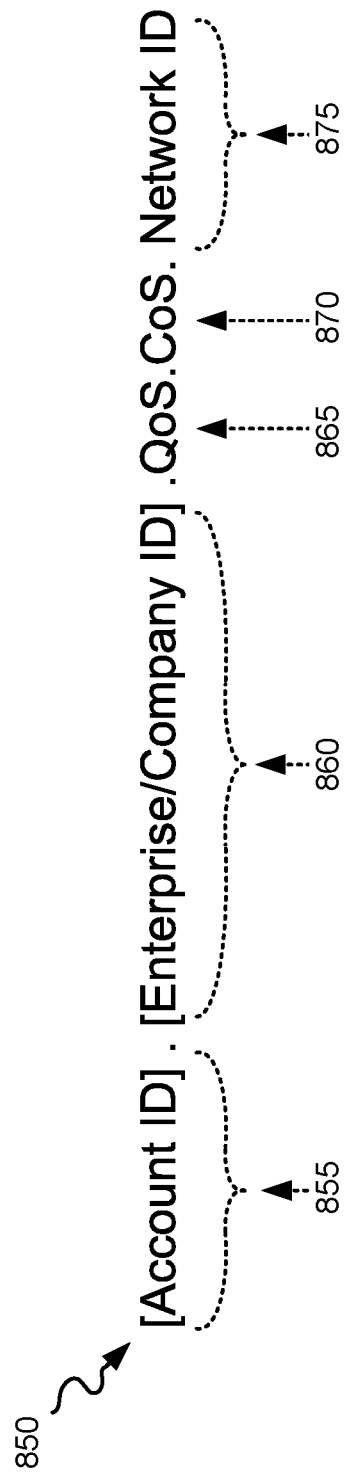
FIG. 8C depicts an exemplary non-IP Access Point Name (APN) for use in NIDD via a wireless network control plane.

Returning to FIG. 6, at block 615, provisioning system(s) 100 identifies a CoS and QoS associated with the selected subscription plan. Provisioning system(s) 100 then generates a non-IP APN with embedded CoS and QoS indicators (block 620). Existing APNs typically include a network identifier and, optionally, an operator identifier. The non-IP APN generated herein includes embedded CoS and/or QoS indicators that correspond to the CoS and QoS of NIDD selected by subscriber 110 in the subscriber plan. FIG. 8C depicts an exemplary non-IP APN 850 for use in NIDD via a wireless network control plane, as described herein. APN 850, as shown, includes an account ID 855, an enterprise or company ID 860, a QoS indicator 865, a CoS indicator 870, and a network ID 875. The APN values 855, 860, 865, 870 and 875 may be appended to one another and separated by a period ".". As described in further detail below, the QoS indicator 865 and the CoS indicator 827 embedded within the APN 850 may be extracted from the APN 850 by MME 120 and/or SCEF node 125 and used for queuing, prioritizing, and forwarding NIDD message traffic among other message traffic. FIG. 7 depicts provisioning system(s) 100 identifying 720 the CoS and QoS associated with the selected subscription plan, and generating 725 a non-IP APN with CoS and QoS indicators embedded within the APN.

Returning to FIG. 6, provisioning system(s) 100 stores the account ID, the account enrollment data, the app server ID(s), the selected subscription plan, the CoS and QoS, and the non-IP APN in account DB 220 (block 625). As shown in FIG. 7, provisioning system(s) 100 sends a message 730 to account DB 220 that includes the account ID and account enrollment data of block 600, the app server ID(s) of block 605, the selected subscription plan of block 610, and identified CoS and QoS of block 615, and the generated APN of block 620. Account DB 220 stores the account ID field 405, the account enrollment data in field 410, the app server ID(s) in field 415, the selected subscription plan in field 420, the CoS and QoS in field 425, and the non-IP APN in field 430 of an entry 400.

Provisioning system(s) 100 determines a SCEF ID(s) for a SCEF(s) that can serve the app server(s) 130 (block 630). Provisioning system(s) 100 may store knowledge of the disposition of SCEF nodes 125-1 through 125-*x* in network(s) 210, and may identify one of the SCEF nodes 125 that can be used for transferring/routing NIDD data from a UE 105 to app server 130, and from app server 130 to UE 105. Various different criteria may be applied by provisioning system(s) 100 to determine which SCEF node 125 to use for transferring data between the UE 105 and the app server 130, such as, for example, latency, available bandwidth, throughput, jitter, error rate, and/or network hops. FIG. 7 depicts provisioning system(s) 100 determining 735 a SCEF ID(s) for a SCEF node(s) that can serve the app server 130.

Provisioning system(s) 100 receives UE ID(s), IMSI(s) and/or MDN(s) of an IoT UE device(s) 105 (block 635). As shown in FIG. 7, subscriber 110 may supply 740 the UE ID(s), IMSI(s), and/or MDN(s) of the IoT UE device(s) 105 associated with subscriber 110's account. Alternatively, provisioning system(s) 100 may query the IoT UE device(s) 105, or an appropriate node in the wireless network, to retrieve the UE ID(s), IMSI(s), and/or MDN(s) of the IoT UE device(s) 105. Provisioning system(s) 100 stores the UE ID(s), UE IMSI(s)/MDN(s), non-IP APN, and SCEF ID(s) in HSS 115 (block 640). Provisioning system(s) 100 sends a message 745, as depicted in FIG. 7, that includes the UE ID(s), IMSI(s)/MDN(s), non-IP APN, and SCEF ID(s) to HSS 115. Upon receipt of the message 745, HSS 115 stores the UE ID in field 505, the IMSI/MDN in field 510, the non-IP APN in field 515, and the SCEF ID(s) in field 520 of a different entry 500 for each different IoT UE 105.

The exemplary process of FIG. 6 may, in one implementation, be repeated at provisioning system(s) 100 at each occurrence of a subscriber 110 establishing an account, and selecting a subscription plan, for obtaining NIDD service from the wireless network service provider for the subscriber 110's IoT UE devices 105.

Figure 9:
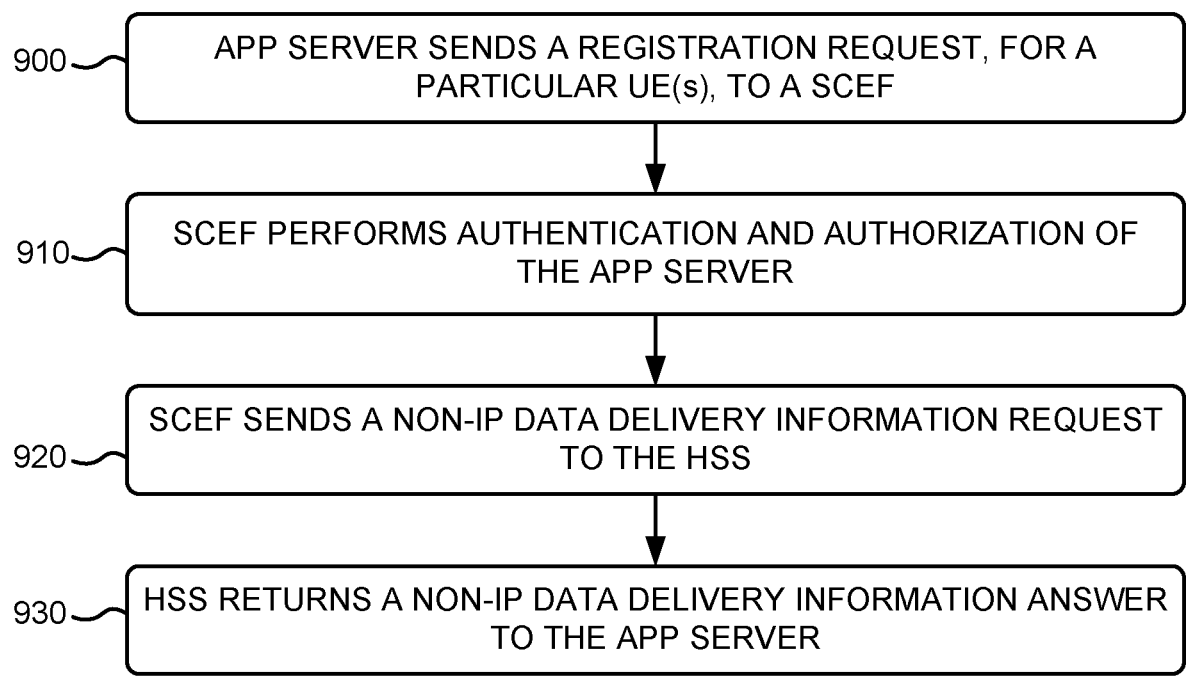
FIG. 9 is a flow diagram that illustrates an exemplary process for registering an application server with a SCEF node for one or more IoT user equipment devices.

FIG. 9 is a flow diagram that illustrates an exemplary process for registering an app server 130 with a SCEF node 125 for one or more UE(s) 105. The exemplary process of FIG. 9 may be implemented by app server 130, a SCEF node 125, and HSS 115. The exemplary process of FIG. 9 is described below with reference to the exemplary messaging/operations diagram of FIG. 10.

Figure 10:
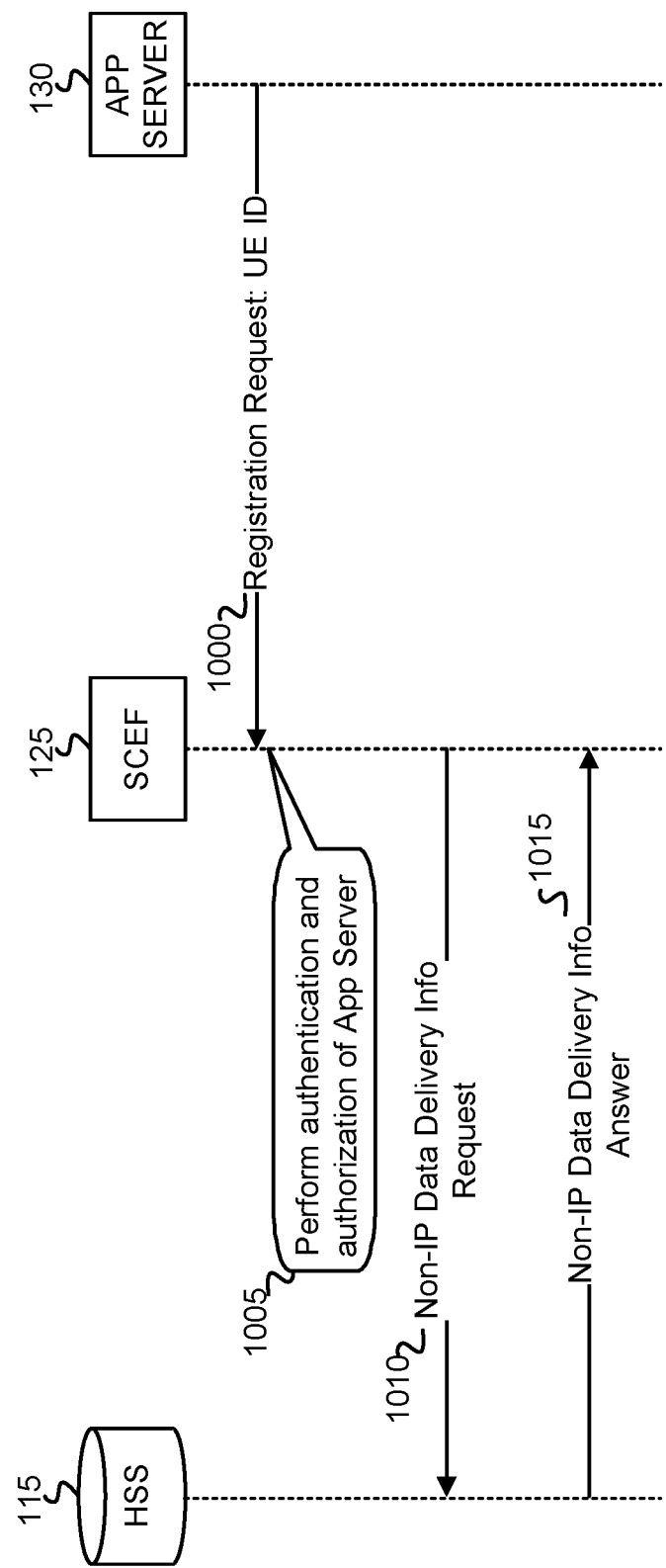
FIG. 10 is an exemplary operations/messaging diagram associated with the exemplary process of FIG. 9.

App server 130 sends a registration request, for one or more particular UEs 105, to a SCEF node 125 (block 900). In one implementation, provisioning system(s) 100 may supply the SCEF ID, as determined in block 630 of the process of FIG. 6, to app server 130. App server 130, as depicted in FIG. 10, generates a registration request 1000 that includes a UE ID, IMSI and/or MDN of one or more IoT UEs 105, and sends the registration request 1000 to the SCEF node 125 corresponding to the supplied SCEF ID. SCEF node 125 performs authentication and authorization of the app server 130 (block 910). Various different existing authentication techniques may be used by SCEF node 125 for authenticating the app server 130 and/or the registration request 1000. FIG. 10 depicts SCEF node 125 performing 1005 authentication and authorization of the app server 130.

SCEF node 125 sends a non-IP data delivery information request to HSS 115 (block 920). In response to receiving the registration request from the app server 130, SCEF node 125 generates a NIDD info request that includes the UE ID received in the registration request 1000 from the app server 130, and the SCEF node 125's SCEF ID. FIG. 10 depicts SCEF node 125 sending a request 1010 for non-IP data delivery between app server 130 and the IoT UE device 105 identified in the registration request message 1000. HSS 115, upon receipt of the non-IP data delivery information request, returns a non-IP data delivery information answer to the app server 130 to complete the UE registration onto the SCEF node 125 for the requesting app server (block 930). Upon receipt of the NIDD info request, a lookup is performed into HSS 115 to locate an entry 500 having a UE ID in field 505 that matches the UE ID received in the registration request, and a SCEF ID in field 520 of the same entry 500 that matches the SCEF ID of the SCEF node 125 sending the NIDD information request. If such an entry 500 is located, then HSS 115 returns the NIDD information answer 1015 to SCEF node 125 to complete the UE registration for the app server, as shown in FIG. 10.

Figure 11A:
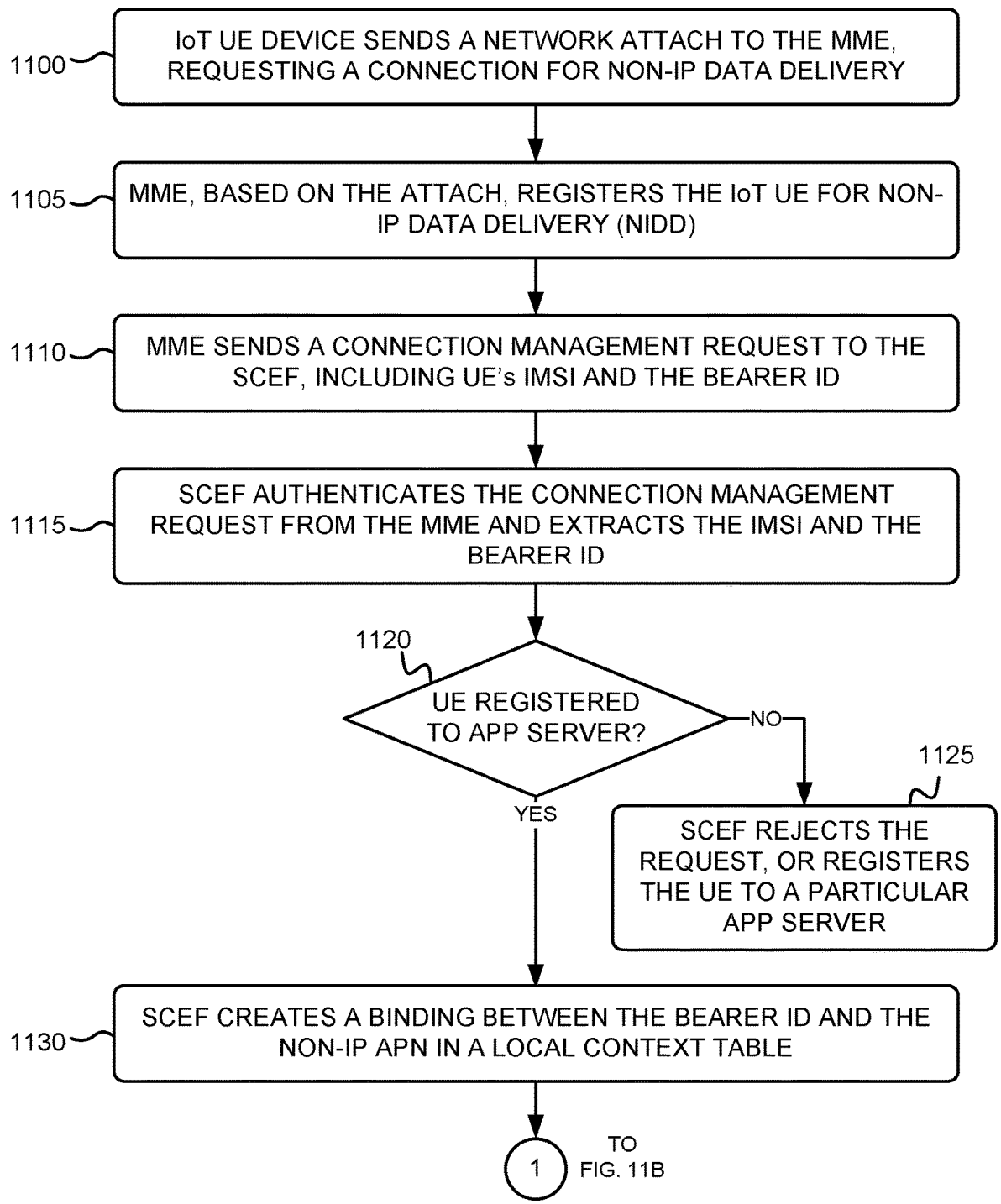
FIGS. 11A and 11B are flow diagrams that illustrate an exemplary process for the establishment of a connection between an MME and a SCEF node for NIDD between an IoT user equipment device and an application.
Figure 11B:
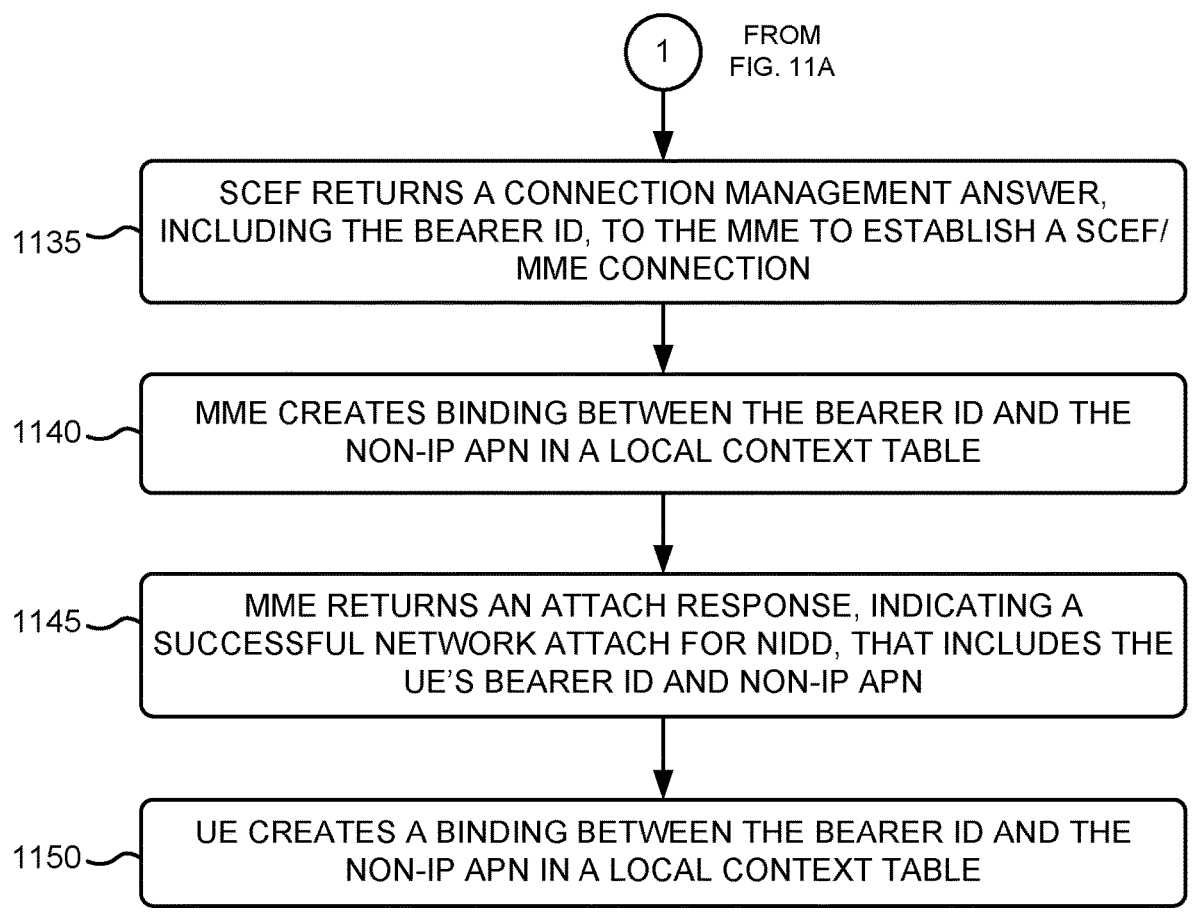

FIG. 11 is a flow diagram that illustrates an exemplary process for the establishment of a connection between an MME 120 and a SCEF node 125 for non-IP data delivery between an IoT UE device 105 and an app server 130. The exemplary process of FIG. 11 may be implemented by UE 105, MME 120, and SCEF node 125. The exemplary process of FIG. 11 is described below with reference to the exemplary messaging/operations diagram of FIG. 12.

Figure 12:
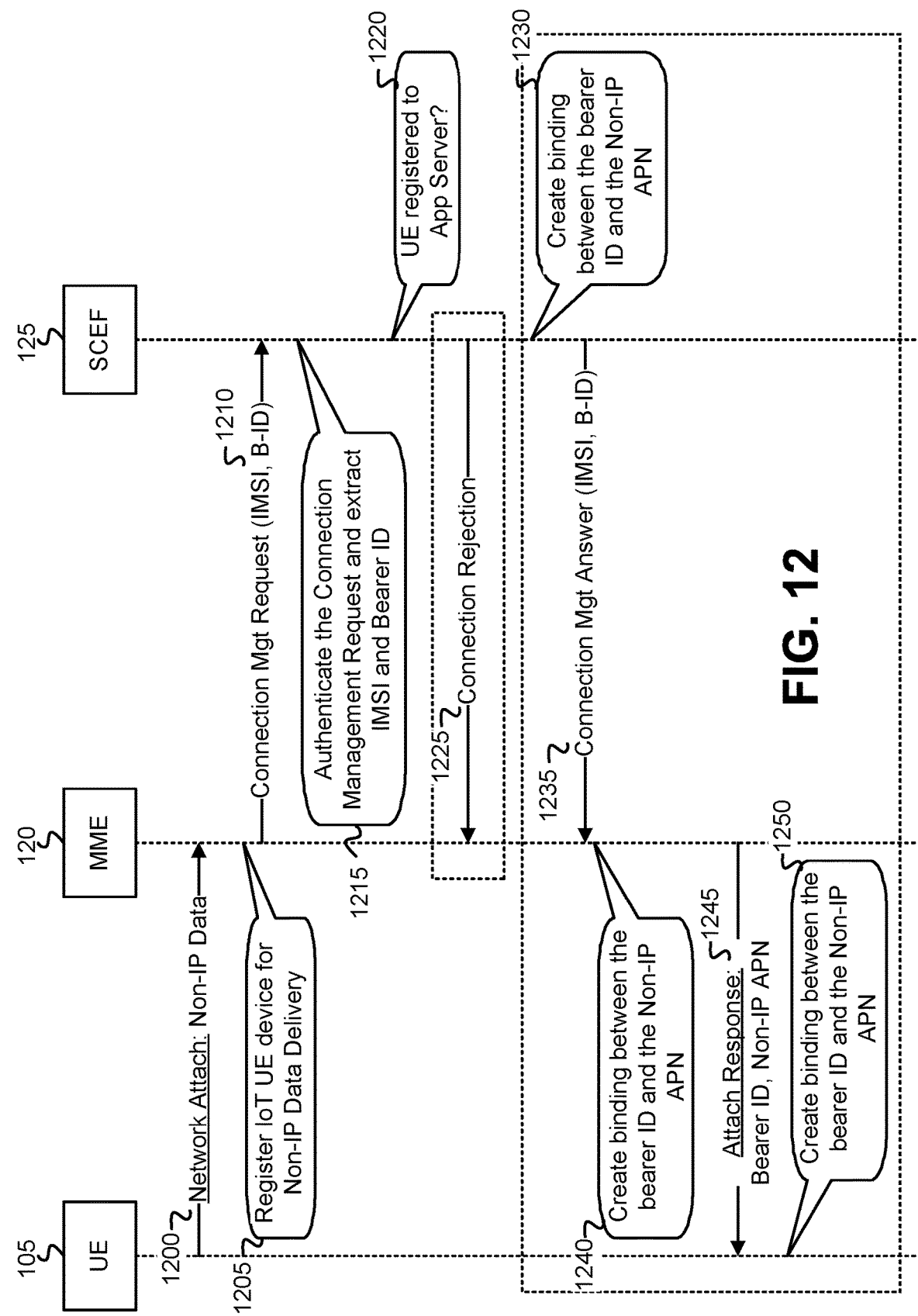
FIG. 12 is an exemplary operations/messaging diagram associated with the exemplary process of FIGS. 11A and 11B.

UE device 105 sends a network attach request to MME 120 that requests a connection for non-IP message data delivery (NIDD) (block 1100). The network attach request from the UE device 105 may include a flag, or other indicator, identifier, or data, that can be interpreted as a request for NIDD between UE device 105 and an app server 130. FIG. 12 depicts UE 105 sending a network attach request 1200 to MME 120 to request non-IP data delivery to/from UE 105.

MME 120, based on the attach request, registers the UE 105 for non-IP data delivery (NIDD) (block 1105), and sends a connection management request (CMR) to the SCEF node 125, including the UE 105's bearer ID and the UE 105's IMSI (block 1110). Registration of the UE 105 for data delivery may include MME 120, or another responsible node in wireless network(s) 210, assigning a bearer ID to the UE 105's transport session. FIG. 12 depicts MME 120 registering 1205 the IoT UE device 105 for non-IP data delivery and, upon registration, sending a connection management request 1210 to SCEF node 125 that includes the bearer ID and the UE 105's IMSI.

SCEF node 125 authenticates the Connection Management Request from the MME 120 and extracts the IMSI and the bearer ID (block 1115). SCEF node 125 may use existing authentication techniques for authenticating the Connection Management Request. FIG. 12 depicts SCEF node 125 authenticating 1215 the Connection Management Request, and extracting the UE 105's IMSI and bearer ID. If the Connection Management Request has been successfully authenticated, SCEF node 125 determines if the UE 105 has been previously registered to an app server 130 (block 1120). For example, SCEF node 125 determines if an app server 130 has registered for the particular UE 105 in block 900 of the process of FIG. 9. If the UE 105 has not been registered to an app server 130 (NO—block 1120), then SCEF node 125 rejects the request, or initiates a process for registering the UE 105 to a particular app server 130 (block 1125). For example, the SCEF node 125 may cause the app server 130 to begin the registration process of FIG. 9 by sending a registration request for the UE 105 to SCEF node 125. FIG. 12 depicts SCEF node 125 determining 1215 if the UE 105 has been registered to an app server 130 and, if not, returning a connection rejection 1225 to MME 120, or initiating 1225 the app server SCEF registration process of FIG. 9.

If an app server 130 has registered for the UE 105 (YES—block 1120), then the SCEF node 125 creates a binding between the bearer ID and the non-IP APN in a local context table (block 1130), and returns a connection management answer (CMA), including the bearer ID, and the UE 105's IMSI, to the MME 120 to establish a SCEF/MME connection for the non-IP data delivery (block 1135). FIG. 12 depicts SCEF node 125 creating 1230 a binding between the bearer ID and the UE 105's non-IP APN, and returning a connection management answer 1235 to MME 120 that includes the bearer ID and the UE 105's IMSI.

MME 120 creates a binding between the bearer ID and the non-IP APN in a local context table (block 1140). MME 120 may, in one implementation, retrieve the UE 105's non-IP APN from HSS 115 and may bind the assigned bearer ID (B-ID) to the non-IP APN in local memory. MME 120 may subsequently use the B-ID to retrieve the bound non-IP APN from local memory. MME 120 returns an Attach Response message to the requesting UE 105, indicating a successful network attach for NIDD, that includes the UE 105's bearer ID and the non-IP APN (block 1145). FIG. 12 depicts MME 120 creating 1240 a binding between the bearer ID and the non-IP APN, and returning an Attach Response 1245 to UE 105 that includes the bearer ID and the non-IP APN. Upon receipt of the Attach Response message, the UE 105 creates a binding between the bearer ID and the non-IP APN in a local context table (block 1150). UE 105 may subsequently use the B-ID to retrieve the bound non-IP APN from the locally stored context table. FIG. 12 depicts UE 105 creating 1250 a binding between the bearer ID and the non-IP APN.

Figure 13:
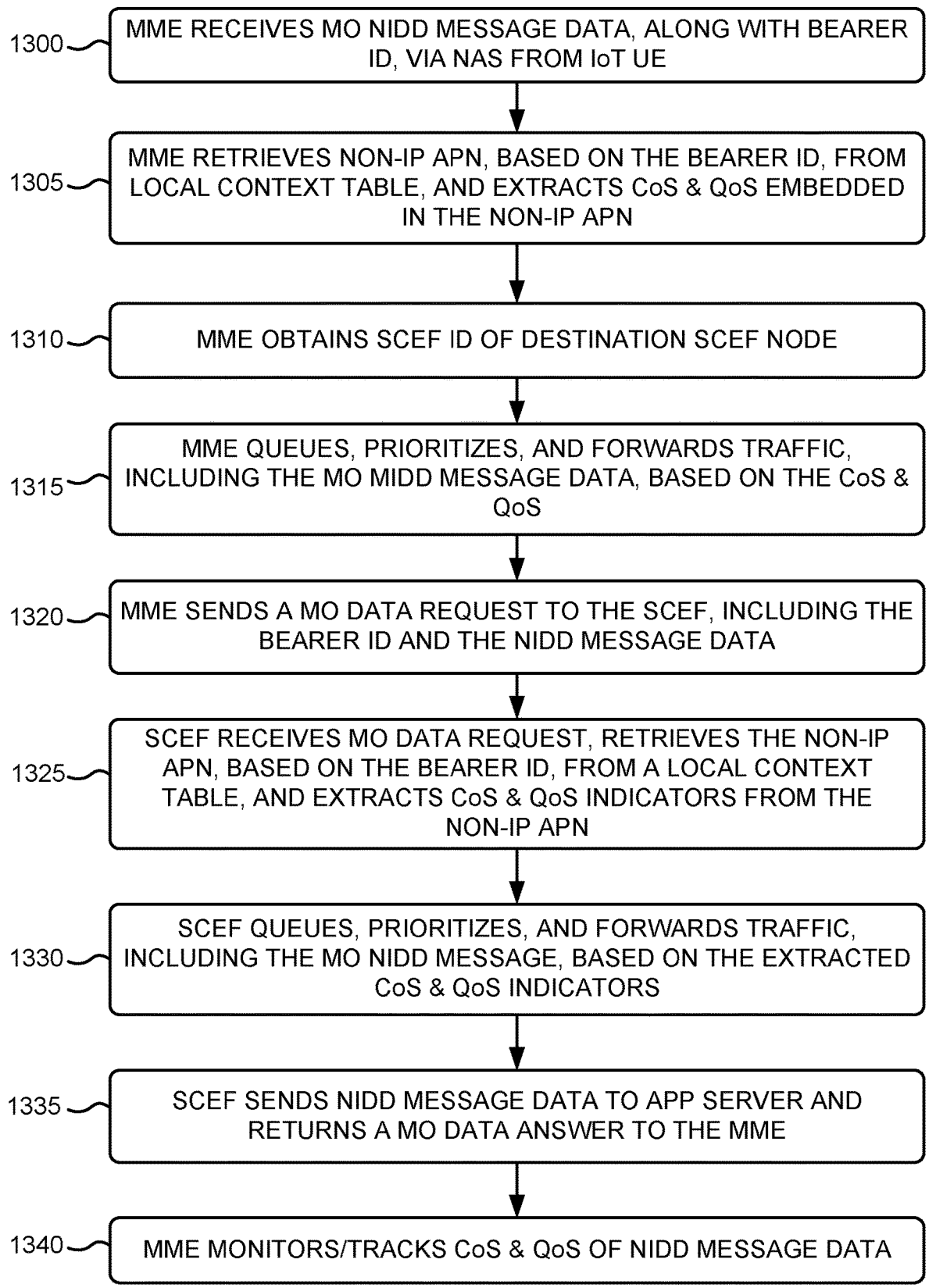
FIG. 13 is a flow diagram that illustrates an exemplary process for mobile originated NIDD from a user equipment device to an application server via a control plane in a wireless network.

FIG. 13 is a flow diagram that illustrates an exemplary process for mobile originated non-IP data delivery from a UE 105 to an app server 130 via a control plane in a wireless network. The exemplary process of FIG. 13 may be implemented by MME 120 and SCEF node 125. The exemplary process of FIG. 13 is described below with reference to the exemplary messaging/operations diagram of FIG. 14.

Figure 14:
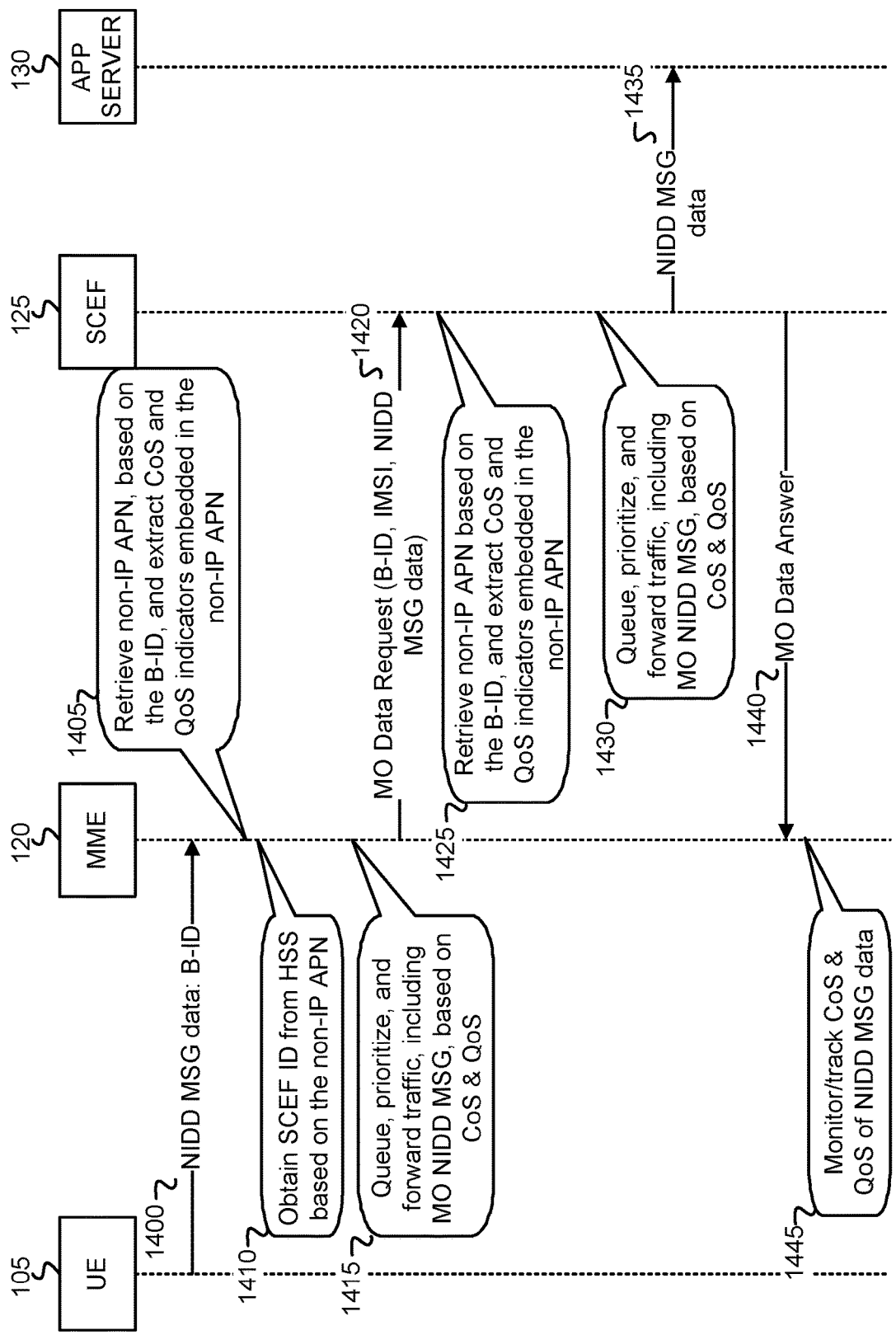
FIG. 14 is an exemplary operations/messaging diagram associated with the exemplary process of FIG. 13.

MME 120 receives MO NIDD message data along with a bearer ID, via Network Access Stratum (NAS) signaling, from a UE 105 (block 1300), and retrieves a non-IP APN, based on the received bearer ID, from a local context table, and extracts CoS and QoS indicators embedded in the non-IP APN (block 1305). The IoT UE 105 may, for example, generate sensor measurement data, or device status update data, and send the data as MO message data to MME 120 via NAS signaling. Referring to the example of FIG. 8C, MME 120 may extract the CoS indicator 870 and the QoS indicator 865 from the APN 850. FIG. 14 depicts MME 120 receiving, from a UE 105, NIDD message data 1400 along with a bearer ID (B-ID), and retrieving 1405 a non-IP APN, based on the bearer ID, and extracting 1405 CoS and QoS indicators embedded in the retrieved non-IP APN. In some implementations, upon receipt of the NIDD message data 1400, MME 120 may generate a timestamp of the time (e.g., down to a hundredth or thousandth of a second) that the data was received at MME 120.

MME 120 obtains the SCEF ID of the SCEF node 125 associated with the destination app server 130 (block 1310). MME 120 may retrieve the SCEF ID from HSS 115. For example, an entry 500 of HSS 115 may be identified having a non-IP APN stored in field 515 that matches the non-IP APN retrieved at the MME 120 from a local context table based on the bearer ID, and the SCEF ID(s) stored in field 520 of the identified entry 500 may be retrieved as the destination SCEF ID. FIG. 14 depicts MME 120 obtaining 1410 the SCEF ID from the HSS 115 based on the non-IP APN. MME 120 queues, prioritizes, and forwards traffic, including the mobile originated (MO) NIDD message data, based on the extracted CoS and QoS (block 1315. MME 120 queues and prioritizes incoming NIDD message data, including the MO NIDD message data received from UE 105, among one another based on the extracted CoS and QoS indicators. For example, if the CoS and QoS indicators extracted from the APN of the received MO NIDD message data are CoS=1 and QoS=1 (High), then the MO NIDD message is prioritized higher than other NIDD message data having a lower CoS and/or a lower QoS, and queued accordingly. MME 120 dequeues the MO NIDD message data in a specific order, relative to other queued NIDD message data from other UEs 105 and/or other app servers 130, based on the extracted CoS and QoS and possibly based on the timestamp associated with each received NIDD message data. Therefore, queued NIDD message data having a higher CoS should be dequeued and forwarded relative to other NIDD message data having a lower CoS. Additionally, queued NIDD message data having a higher QoS should be dequeued and forwarded relative to other NIDD message data having a lower QoS. The timestamp associated with each NIDD message data may be used to determine dequeuing order for NIDD message data having a same CoS and/or same QoS. Thus, NIDD message data having an earlier timestamp, but a same CoS and Qos, should be dequeued and forwarded relative to other NIDD message data having later timestamps. FIG. 14 depicts MME 120 queuing 1415, prioritizing, and forwarding traffic, including the NIDD message, based on the CoS and QoS extracted from the non-IP APN.

MME 120 sends a MO data request to the SCEF node 125 that corresponds to the SCEF ID, including the bearer ID and the NIDD message data (block 1320). Upon dequeuing of the MO NIDD message data based on the CoS and QoS indicators, as described with respect to block 1315 above, MME 120 generates the MO data request, including the bearer ID and the MO NIDD message data, and forwards the MO data request to the SCEF node 125 identified in block 1310. FIG. 14 depicts MME 120 sending a MO Data Request 1420 to SCEF node 125, including the bearer ID (B-ID), the UE 105's IMSI, and the NIDD message data 1400 received from the UE 105.

SCEF node 125 receives the MO data request, retrieves the non-IP APN based on the bearer ID contained in the MO data request from a local context table, and extracts the CoS and QoS indicators from the non-IP APN (block 1325). FIG. 14 depicts SCEF node 125 retrieving 1425 the non-IP APN based on the bearer ID, and extracting the CoS and QoS indicators embedded in the non-IP APN. SCEF node 125 queues, prioritizes, and forwards traffic, including the MO NIDD message, based on the extracted CoS and QoS indicators (block 1330). In some implementations, upon receipt of the MO Data Request, including NIDD message data, SCEF node 125 may generate a timestamp of the time (e.g., down to a hundredth or thousandth of a second) that the request was received at SCEF node 125. SCEF node 125 queues and prioritizes incoming NIDD message data, including the MO NIDD message data received from UE 105 via MME 120, among one another based on the extracted CoS and QoS indicators. For example, if the CoS and QoS indicators extracted from the APN of the received MO NIDD message data are CoS=1 and QoS=1 (High), then the MO NIDD message is prioritized higher than other NIDD message data having a lower CoS and/or a lower QoS, and queued accordingly. SCEF node 125 dequeues the MO NIDD message data in a specific order, relative to other queued NIDD message data originating from other UEs 105 and/or other app servers 130, based on the extracted CoS and QoS and possibly based on the timestamp associated with each received NIDD message data. Therefore, queued NIDD message data having a higher CoS should be dequeued and forwarded relative to other NIDD message data having a lower CoS. Additionally, queued NIDD message data having a higher QoS should be dequeued and forwarded relative to other NIDD message data having a lower QoS. The timestamp associated with each NIDD message data may be used to determine dequeuing order for NIDD message data having a same CoS and/or same QoS. Thus, NIDD message data having an earlier timestamp, but a same CoS and Qos, should be dequeued and forwarded relative to other NIDD message data having later timestamps.

FIG. 14 depicts SCEF 125 receiving the MO Data Request 1420, including the B-ID, the UE 105's IMSI, and the NIDD message data, from MME 120, retrieving 1425 the non-IP APN from a local context table based on the B-ID, and extracting the CoS and QoS indicators embedded in the non-IP APN. FIG. 14 further shows SCEF node 125 queuing 1430, prioritizing, and forwarding traffic, including the MO NIDD message data, based on the CoS and QoS indicators.

SCEF node 125 sends the NIDD message data to the app server 130 and returns a MO data answer to the MME 120 (block 1335). Upon dequeuing of the MO NIDD message data based on the CoS and QoS indicators, as described with respect to block 1330 above, SCEF node 125 forwards the MO NIDD message data to the destination app server 130. FIG. 14 depicts SCEF node 125 sending a message 1435, that includes NIDD message data, to the destination app server 130, and returning a MO Data Answer 1440 to MME 120 acknowledging delivery of the NIDD message data to the app server 130.

MME 120 monitors/tracks CoS and QoS of NIDD message data (block 1340). MME 120 tracks incoming NIDD message data relative to outgoing NIDD message data to determine network performance measures such as, for example, throughput, jitter, and/or latency. MME 120 compares the performance measures to CoS and QoS indicators associated with particular NIDD message data to verify that the appropriate priority and preemption levels are being maintained for the respective levels of CoS and QoS. FIG. 14 depicts MME 120 monitoring/tracking 1445 the CoS and QoS of NIDD message data forwarded from MME 120 to SCEF 125 and/or from MME 120 towards UE 105.

Figure 15:
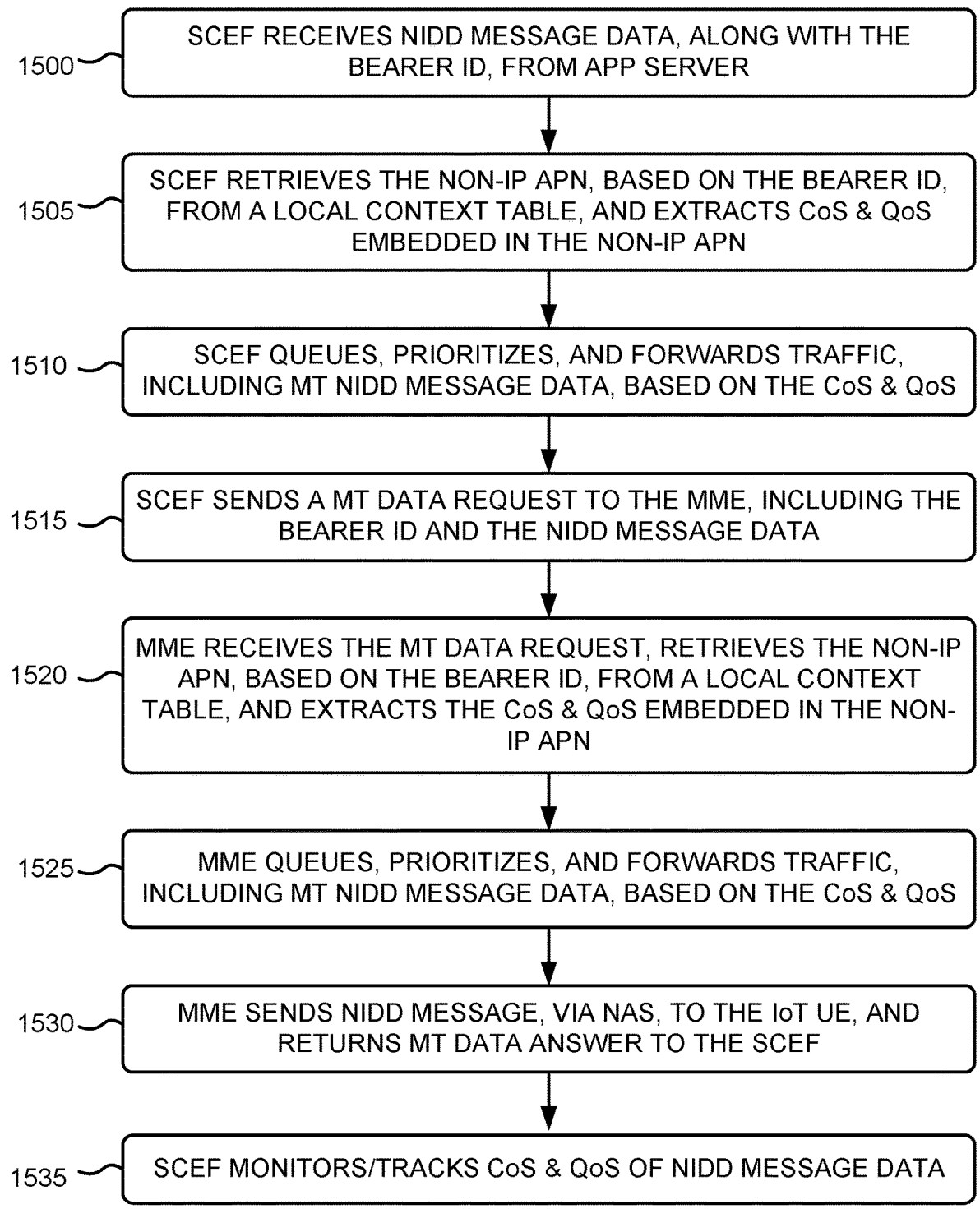
FIG. 15 is a flow diagram that illustrates an exemplary process for mobile terminated NIDD from an application server to a user equipment device via a control plane in a wireless network.

FIG. 15 is a flow diagram that illustrates an exemplary process for mobile terminated (MT) non-IP data delivery from an app server 130 to a UE 105 via a control plane in a wireless network. The exemplary process of FIG. 15 may be implemented by SCEF node 125 and MME 120. The exemplary process of FIG. 15 is described below with reference to the exemplary messaging/operations diagram of FIG. 16.

Figure 16:
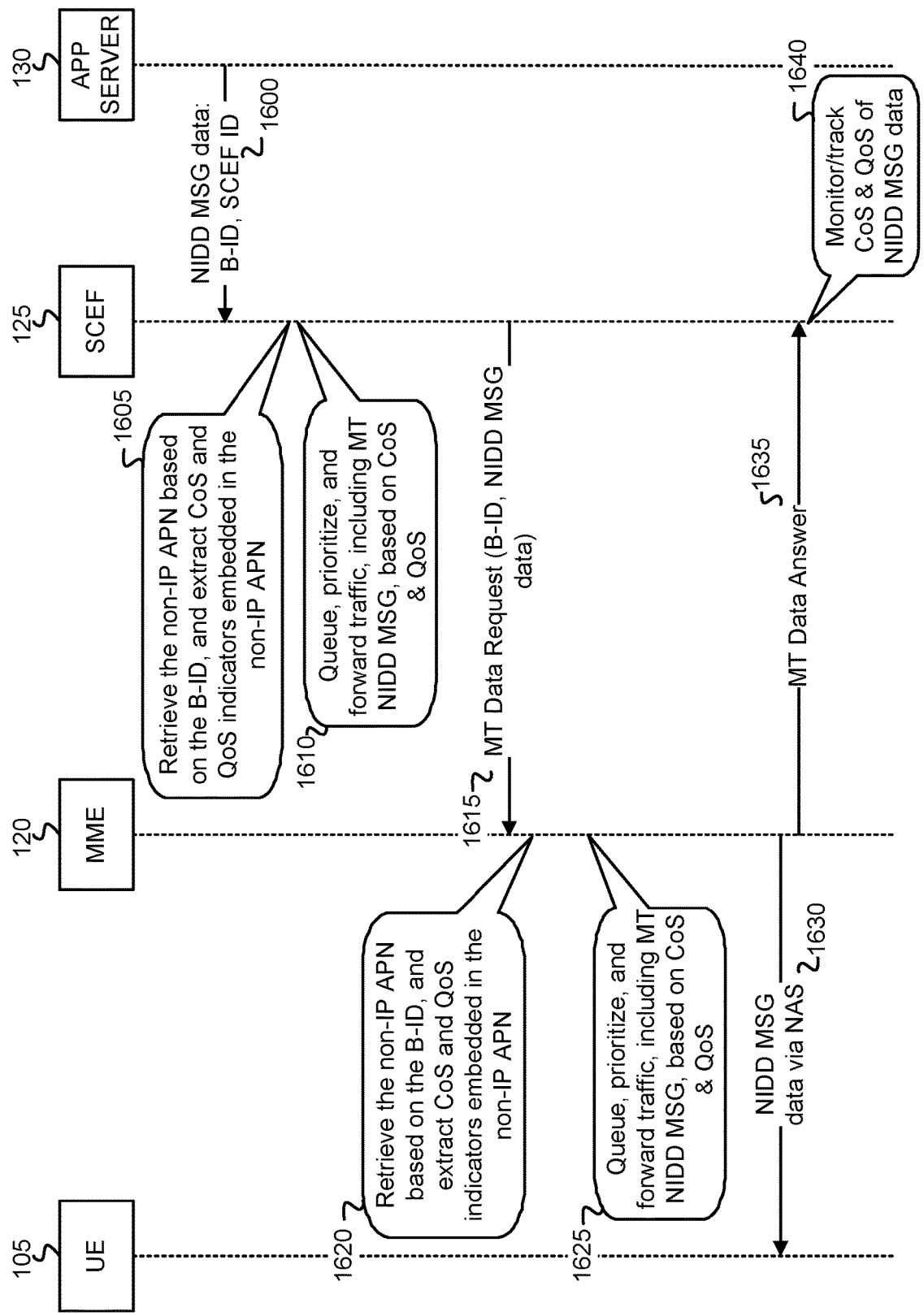
FIG. 16 is an exemplary operations/messaging diagram associated with the exemplary process of FIG. 15.

SCEF node 125 receives NIDD message data from an app server 130 (block 1500). App server 130 may generate instructions, or other types of data, that is to be sent to one or more IoT UE devices 105 via NIDD message data. App server 130 identifies the one or more destination UE devices 105, the bearer ID associated with the transport session, and the SCEF ID of the SCEF node 125 that is to be used for forwarding the NIDD message data, via the control plane, towards the one or more destination UE devices 105. App server 130 generates a message that includes the NIDD message data, the bearer ID, and the SCEF ID. In some implementations, upon receipt of the NIDD message data, SCEF node 125 may generate a timestamp of the time (e.g., down to a hundredth or thousandth of a second) that the data was received at SCEF node 125. FIG. 16 depicts SCEF node 125 receiving a message 1600 that includes NIDD message data, the bearer ID, and a SCEF ID, from app server 130.

SCEF node 125 retrieves a non-IP APN, based on the bearer ID, from a local context table, and extracts CoS and QoS indicators embedded in the non-IP APN (block 1505). SCEF node 125 further queues, prioritizes, and forwards traffic, including the MT NIDD message data, based on the extracted CoS and QoS indicators (block 1510). Referring to the example of FIG. 8C, MME 120 may extract the CoS indicator 870 and the QoS indicator 865 from the APN 850. SCEF node 125 queues and prioritizes incoming NIDD message data, including the MT NIDD message data received from app server 130, among one another based on the extracted CoS and QoS indicators. For example, if the CoS and QoS indicators extracted from the APN of the received NIDD message data are CoS=1 and QoS=1 (High), then the NIDD message is prioritized higher than other NIDD message data having a lower CoS and/or a lower QoS, and queued accordingly. SCEF node 125 dequeues the NIDD message data in a specific order, relative to other queued NIDD message data originating from other app servers 130 and/or other UE 105's, based on the extracted CoS and QoS and possibly based on the timestamp associated with each received NIDD message data. Therefore, queued NIDD message data having a higher CoS should be dequeued and forwarded relative to other NIDD message data having a lower CoS. Additionally, queued NIDD message data having a higher QoS should be dequeued and forwarded relative to other NIDD message data having a lower QoS. The timestamp associated with each NIDD message data may be used to determine dequeuing order for NIDD message data having a same CoS and/or same QoS. Thus, NIDD message data having an earlier timestamp, but a same CoS and QoS, should be dequeued and forwarded relative to other NIDD message data having later timestamps. FIG. 16 depicts SCEF node 125 retrieving 1605 the non-IP APN based on the bearer ID from the locally stored context table, and extracting 1605 the CoS and QoS indicators embedded in the non-IP APN. FIG. 16 further shows SCEF node 125 queuing 1610, prioritizing, and forwarding traffic, including the MT NIDD message data, based on the extracted CoS and QoS indicators.

SCEF node 125 sends a MT data request to the MME 120, including the bearer ID, the destination UE 105's IMSI, and the NIDD message data (block 1515). Upon dequeuing of the MT NIDD message data based on the CoS and QoS indicators, as described with respect to block 1510 above, SCEF node 125 generates a MT data request that includes the MT NIDD message data from the app server 130, the bearer ID, and the destination UE 105's IMSI. FIG. 16 depicts SCEF node 125 sending a MT Data Request 1615 to MME 120 that includes the bearer ID, an IMSI of the destination UE 105, and the NIDD message data.

MME 120 receives the MT data request, retrieves the non-IP APN based on the bearer ID from a local context table, and extracts the CoS and QoS indicators embedded in the non-IP APN (block 1520). MME 120 further queues, prioritizes, and forwards traffic, including the MT NIDD message data, based on the extracted CoS and QoS indicators (block 1525). In some implementations, upon receipt of the MT data requesting that includes the MT NIDD message data, MME 120 may generate a timestamp of the time (e.g., down to a hundredth or thousandth of a second) that the data was received at MME 120.

MME 120 queues and prioritizes incoming NIDD message data, including the MT NIDD message data received from app server 130 via a SCEF node 125, among one another based on the extracted CoS and QoS indicators. For example, if the CoS and QoS indicators extracted from the APN of the received NIDD message data are CoS=1 and QoS=1 (High), then the NIDD message is prioritized higher than other NIDD message data having a lower CoS and/or a lower QoS, and queued accordingly. MME 120 dequeues the NIDD message data in a specific order, relative to other queued NIDD message data originating from other app servers 130 and/or other UE 105's, based on the extracted CoS and QoS and possibly based on the timestamp associated with each received NIDD message data. Therefore, queued NIDD message data having a higher CoS should be dequeued and forwarded relative to other NIDD message data having a lower CoS. Additionally, queued NIDD message data having a higher QoS should be dequeued and forwarded relative to other NIDD message data having a lower QoS. The timestamp associated with each NIDD message data may be used to determine dequeuing order for NIDD message data having a same CoS and/or same QoS. Thus, NIDD message data having an earlier timestamp, but a same CoS and QoS, should be dequeued and forwarded relative to other NIDD message data having later timestamps. FIG. 16 depicts MME 120 receiving the MT Data Request 1615 from SCEF node 125, retrieving 1620 the non-IP APN based on the bearer ID from the locally stored context table, and extracting the CoS and QoS indicators embedded in the non-IP APN. FIG. 14 further depicts MME 120 queuing 1625, prioritizing, and forwarding traffic, including the MT NIDD message data, based on the extracted CoS and QoS indicators.

MME 120 sends the NIDD message data via NAS to the destination UE 105, and returns an MT data answer to the SCEF node 125 (block 1530). Upon dequeuing of the MT NIDD message data based on the CoS and QoS indicators, as described with respect to block 1525 above, MME 120 generates a message that includes the MT NIDD message data for forwarding to the destination UE 105. FIG. 16 depicts MME 120 sending the NIDD message data 1630, via NAS, to the UE 105, and returning a MT Data Answer 1635 to SCEF node 125 acknowledging delivery of the NIDD message data.

SCEF node 125 monitors/tracks CoS and QoS of NIDD message data (block 1535). SCEF node 125 tracks incoming NIDD message data relative to outgoing NIDD message data to determine network performance measures such as, for example, throughput, jitter, and/or latency. SCEF node 125 compares the performance measures to CoS and QoS indicators associated with particular NIDD message data to verify that the appropriate priority and preemption levels are being maintained for the respective levels of CoS and QoS. FIG. 16 depicts SCEF node 125 monitoring/tracking 1640 CoS and QoS of NIDD message data that transits SCEF node 125.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 9, 11A, 11B, 13, and 15, and message/operations flows with respect to FIGS. 7, 10, 12, 14, and 16, the order of the blocks and/or the message/operations flows may be varied in other implementations. Moreover, non-dependent blocks may be performed in parallel. Embodiments have been described herein as using CoS and QoS indicators embedded in APNs for controlling the prioritizing of NIDD at MME 120 and SCEF nodes 125 within the wireless network. The CoS and QoS indicators embedded in the APNs may additionally be used for mapping the CoS and/or QoS indicators to a particular network slice in the wireless network (e.g., a Fifth Generation (5G) network) and/or to a particular radio frequency (RF) QoS when data is transmitted from eNBs 230 to UEs 105. The non-IP APN, with embedded CoS and QoS indicators, as described herein, additionally supports roaming of UEs 105 when the UEs 105 enter a region serviced by a different MME 120. In such instances, the MME 120 may extract the embedded CoS and QoS indicators, as described herein, to prioritize NIDD traffic.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving message data, at a node in a wireless network, from an Internet of Things (IoT) device;
   obtaining, by the node, a non-Internet Protocol (IP) Access Point Name (APN) associated with the message data;
   extracting, by the node, Class of Service (CoS) and Quality of Service (QoS) indicators embedded in the non-IP APN;
   queuing and prioritizing the message data, among other message data, based on the extracted CoS and QoS indicators; and
   dequeuing and forwarding the message data, among the other message data, from the node to a Service Capability Exposure Function (SCEF) node associated with a destination application server based on the extracted CoS and QoS indicators, wherein dequeuing and forwarding the message data includes dequeuing and forwarding message data with higher CoS and QoS indicators to the SCEF node before dequeuing and forwarding message data with lower CoS and QoS indicators to the SCEF node.

2. The method of claim 1, further comprising:
   receiving the message data at the SCEF node;
   obtaining, by the SCEF node, the non-IP APN associated with the message data;
   extracting, by the SCEF node, the CoS and QoS indicators embedded in the non-IP APN;
   queuing and prioritizing the message data, among other message data at the SCEF node, based on the extracted CoS and QoS indicators; and
   dequeuing and forwarding the message data, among the other message data, from the SCEF node towards the destination application server based on the extracted CoS and QoS indicators.

3. The method of claim 1, wherein the message data comprises data to be delivered via non-IP data delivery (NIDD) over a control plane in the wireless network.

4. The method of claim 1, wherein the node comprises a Mobility Management Entity (MME) in the wireless network.

5. The method of claim 1, wherein forwarding the message data comprises:
   sending the message data from the node to the SCEF node via a control plane of the wireless network.

6. The method of claim 1, wherein the non-IP APN further comprises at least one of an account identifier or a network identifier.

7. The method of claim 1, further comprising:
   receiving second message data, at the SCEF node, from an application server and destined for the IoT device;
   obtaining the non-IP APN associated with the second message data;
   extracting, by the SCEF node, the CoS and QoS indicators embedded in the non-IP APN;
   queuing and prioritizing the second message data, among other message data, based on the extracted CoS and QoS indicators; and
   dequeuing and forwarding the second message data, among the other message data, from the SCEF node to the node based on the extracted CoS and QoS indicators.

8. A network device, comprising:
   a memory device;
   a communication interface configured to receive message data from an Internet of Things (IoT) device; and
   a processing unit configured to:
      obtain a non-Internet Protocol (IP) Access Point Name (APN) associated with the message data;
      extract Class of Service (CoS) and Quality of Service (QoS) indicators embedded in the non-IP APN,
      queue and prioritize the message data, among other message data in the memory device, based on the extracted CoS and QoS indicators, and
      dequeue and forward the message data, among the other message data, to a Service Capability Exposure Function (SCEF) node associated with a destination application server based on the extracted CoS and QoS indicators, wherein, when dequeuing and forwarding the message data, the processing unit is configured to dequeue and forward message data with higher CoS and QoS indicators to the SCEF node before dequeuing and forwarding message data with lower CoS and QoS indicators to the SCEF node.

9. The network device of claim 8, wherein the network device connects to a wireless network, and wherein the message data comprises data to be delivered via non-IP data delivery (NIDD) over a control plane in the wireless network.

10. The network device of claim 8, wherein the network device implements a Mobility Management Entity (MME) in the wireless network.

11. The network device of claim 8, wherein, when forwarding the message data, the processing unit is further configured to:
    send the message data, via the communication interface, to the SCEF node via a control plane of the wireless network.

12. The network device of claim 8, wherein the non-IP APN further comprises at least one of an account identifier or a network identifier.

13. The network device of claim 8, wherein the communication interface is further configured to receive second message data from a second IoT device, and
wherein the processing unit is further configured to:
obtain a second non-IP APN associated with the second message data;
extract second CoS and second QoS indicators embedded in the second non-IP APN,
queue and prioritize the second message data, among other message data in the memory device, based on the extracted second CoS and QoS indicators, and
dequeue and forward the second message data, among the other message data, to a second SCEF node based on the extracted second CoS and QoS indicators.

14. The network device of claim 13, wherein, when forwarding the second message data, the processing unit is further configured to:
send the second message data, via the communication interface, to the second SCEF node via a control plane of the wireless network.

15. A non-transitory storage medium storing instructions executable by a network device, wherein the instructions comprise instructions to cause the network device to:
receive message data from an Internet of Things (IoT) device;
obtain a non-Internet Protocol (IP) Access Point Name (APN) associated with the message data;
extract Class of Service (CoS) and Quality of Service (QoS) indicators embedded in the non-IP APN;
queue and prioritize the message data, among other message data, based on the extracted CoS and QoS indicators; and
dequeue and forward the message data, among the other message data, to a Service Capability Exposure Function (SCEF) node associated with a destination application server based on the extracted CoS and QoS indicators, wherein message data with higher CoS and QoS indicators are dequeued and forwarded to the SCEF node prior to message data with lower CoS and QoS indicators.

16. The non-transitory storage medium of claim 15, wherein the network device connects to a wireless network, and wherein the message data comprises data to be delivered via non-IP data delivery (NIDD) over a control plane in the wireless network.

17. The non-transitory storage medium of claim 15, wherein the network device implements a Mobility Management Entity (MME) in the wireless network.

18. The non-transitory storage medium of claim 15, wherein the instructions to cause the network device to forward the message data further comprise instructions to cause the network device to:
send the message data to the SCEF node via a control plane of a wireless network.

19. The non-transitory storage medium of claim 15, wherein the instructions further comprise instructions to cause the network device to:
receive second message data from a second IoT device,
obtain a second non-Internet Protocol (IP) Access Point Name (APN) associated with the second message data;
extract second CoS and second QoS indicators embedded in the second non-IP APN,
queue and prioritize the second message data, among other message data in the memory device, based on the extracted second CoS and QoS indicators, and
dequeue and forward the second message data, among the other message data, to a second SCEF node based on the extracted second CoS and QoS indicators.

20. The non-transitory storage medium of claim 19, wherein the instructions to cause the network device to forward the second message data further comprise instructions to cause the network device to:
send the second message data to the second SCEF node via a control plane of the wireless network.

* * * * *